(12) United States Patent
Yoo

(10) Patent No.: US 11,188,895 B2
(45) Date of Patent: Nov. 30, 2021

(54) VIRTUAL TOKEN-BASED SETTLEMENT PROVIDING SYSTEM, VIRTUAL TOKEN GENERATION APPARATUS, VIRTUAL TOKEN VERIFICATION SERVER, VIRTUAL TOKEN-BASED SETTLEMENT PROVIDING METHOD, AND VIRTUAL TOKEN-BASED SETTLEMENT PROVIDING PROGRAM

(71) Applicant: SSenStone Inc., Seoul (KR)

(72) Inventor: Chang Hun Yoo, Seoul (KR)

(73) Assignee: SSenStone Inc., Seoul (KR)

( * ) Notice: Subject to any disclaimer, the term of this patent is extended or adjusted under 35 U.S.C. 154(b) by 0 days.

(21) Appl. No.: 16/657,170

(22) Filed: Oct. 18, 2019

(65) Prior Publication Data

US 2020/0051070 A1 Feb. 13, 2020

Related U.S. Application Data

(63) Continuation of application No. PCT/KR2018/007850, filed on Jul. 11, 2018.

(30) Foreign Application Priority Data

Aug. 9, 2017 (KR) .................. 10-2017-0100953
May 15, 2018 (KR) .................. 10-2018-0055344

(51) Int. Cl.
*G06Q 20/36* (2012.01)
*G06Q 20/06* (2012.01)
(Continued)

(52) U.S. Cl.
CPC .......... *G06Q 20/3672* (2013.01); *G06F 8/30* (2013.01); *G06F 21/31* (2013.01); *G06F 21/606* (2013.01);
(Continued)

(58) Field of Classification Search
None
See application file for complete search history.

(56) References Cited

U.S. PATENT DOCUMENTS 6,000,832 A    12/1999   Franklin et al.
9,652,770 B1 *   5/2017   Kurani ................. G06Q 20/385
(Continued)

FOREIGN PATENT DOCUMENTS

KR    10-2012-0094481 A    8/2012
KR    10-1316466 B1    10/2013
(Continued)

OTHER PUBLICATIONS

International Search Report issued in PCT/KR2018/007850; dated Jan. 23, 2019.
(Continued)

*Primary Examiner* — Jamie R Kucab
(74) *Attorney, Agent, or Firm* — Studebaker & Brackett PC

(57) ABSTRACT

The present invention relates to a virtual token-based settlement providing system, a virtual token generation apparatus, a virtual token verification server, a virtual token-based settlement providing method, and a virtual token-based settlement providing program. The present invention comprises: a step for receiving a virtual token provided by a virtual token generation means, by a virtual token verification means; a step for extracting multiple detailed codes included in the virtual token by the virtual token verification means; a step for searching for a storage location of an actual card number on the basis of the multiple detailed codes by the virtual token verification means; and a step for transmitting the searched actual card number to a payment settlement service server or a financial company server.

15 Claims, 16 Drawing Sheets

(51) Int. Cl.

| | | |
|---|---|---|
| *G06Q 20/40* | (2012.01) | |
| *H04L 9/32* | (2006.01) | |
| *G06F 8/30* | (2018.01) | |
| *G06Q 20/32* | (2012.01) | |
| *G06Q 20/38* | (2012.01) | |
| *G06F 21/31* | (2013.01) | |
| *G06Q 20/34* | (2012.01) | |
| *G06Q 40/02* | (2012.01) | |
| *H04W 12/033* | (2021.01) | |
| *G06F 21/60* | (2013.01) | |
| *H04L 29/06* | (2006.01) | |

(52) U.S. Cl.
CPC ..... *G06Q 20/0658* (2013.01); *G06Q 20/3274* (2013.01); *G06Q 20/3278* (2013.01); *G06Q 20/351* (2013.01); *G06Q 20/354* (2013.01); *G06Q 20/3674* (2013.01); *G06Q 20/382* (2013.01); *G06Q 20/385* (2013.01); *G06Q 20/4093* (2013.01); *G06Q 40/02* (2013.01); *H04L 9/3213* (2013.01); *H04L 9/3228* (2013.01); *H04L 63/0428* (2013.01); *H04W 12/033* (2021.01); *H04L 2209/56* (2013.01); *H04L 2209/80* (2013.01)

(56) References Cited

U.S. PATENT DOCUMENTS

| | | | |
|---|---|---|---|
| 10,783,516 B2 * | 9/2020 | Benkreira | G06F 40/174 |
| 2015/0134540 A1 | 5/2015 | Law et al. | |
| 2017/0136405 A1 * | 5/2017 | Ravikovitch | C10L 3/104 |
| 2018/0337925 A1 * | 11/2018 | Wallace | G06Q 20/3674 |
| 2020/0051075 A1 * | 2/2020 | Yoo | G06Q 20/409 |
| 2020/0134610 A1 * | 4/2020 | Yoo | G06F 21/30 |
| 2020/0151311 A1 * | 5/2020 | Noe | G06Q 20/327 |
| 2020/0320526 A1 * | 10/2020 | Yoo | G06Q 20/352 |
| 2020/0342439 A1 * | 10/2020 | Lau | G06Q 20/3274 |
| 2020/0380498 A1 * | 12/2020 | Benkreira | G06Q 20/351 |

FOREIGN PATENT DOCUMENTS

| | | |
|---|---|---|
| KR | 10-2013-0134581 A | 12/2013 |
| KR | 10-2016-0036471 A | 4/2016 |
| KR | 10-2016-0119296 A | 10/2016 |
| KR | 10-1675927 B1 | 11/2016 |

OTHER PUBLICATIONS

The extended European search report issued by the European Patent Office dated Apr. 24, 2020, which corresponds to European Patent Application No. 18843472.4-1213 and is related to U.S. Appl. No. 16/657,170.

* cited by examiner

VIRTUAL TOKEN-BASED SETTLEMENT PROVIDING SYSTEM, VIRTUAL TOKEN GENERATION APPARATUS, VIRTUAL TOKEN VERIFICATION SERVER, VIRTUAL TOKEN-BASED SETTLEMENT PROVIDING METHOD, AND VIRTUAL TOKEN-BASED SETTLEMENT PROVIDING PROGRAM

CROSS-REFERENCE TO RELATED APPLICATIONS

The present application is a continuation of International Patent Application No. PCT/KR2018/007850, filed Jul. 11, 2018, which is based upon and claims the benefit of priority to Korean Patent Application Nos. 10-2017-0100953 and 10-2018-0055344, filed on Aug. 9, 2017 and May 15, 2018. The disclosures of the above-listed applications are hereby incorporated by reference herein in their entirety.

BACKGROUND

Embodiments of the inventive concept described herein relate to a virtual token generation device, a virtual token verification server, a virtual token-based payment providing method, and a virtual token-based payment providing program, and more particularly, relate to a system, a method, and a program that may generate a virtual token generated at each time point without duplication and may search for an actual card number based on the virtual token to make a payment, and an device that may generate a virtual token generated at each time point without duplication and may search for an actual card number based on the virtual token to provide the actual card number to a financial company server or a payment settlement service server.

Data of a code type is used in a lot of areas. In addition to the card number or account number used to make a payment, the data of a code type includes an IPIN number, a resident registration number, or the like for user identification.

However, the code data may be leaked when this code data is used. In the case of a card number, because the actual card number is recorded on the card surface as it is, the actual card number is visually exposed to other people. Upon making a payment using a magnet, the card number is leaked to other people while being transmitted to a POS device.

The virtual token has been used to prevent the actual card number from being leaked. However, the data for identifying a user is needed to search for the actual card number corresponding to the virtual token. For example, the code of One Time Password (OTP) is generated while being changed for each time. However, in the case of OTP, a login procedure is needed to determine the algorithm assigned to the user, and it is inconvenient for the user to log in.

Moreover, because the conventional virtual token is used after being received through the communication with a virtual token service server, when communication is not possible, there is inconvenience that the virtual token is not used. Furthermore, when a user terminal is connected to Wi-Fi, there was an inconvenience that the virtual token is not used to improve security. As a result, only when wireless communication (e.g., 3G or LTE) may be used, the payment may be made with a virtual token.

Accordingly, there is a need for the inventive concept that searches for the actual card number based on the virtual token changed in real time. Also, there is need for a virtual token service capable of being used even when the wireless communication is impossible.

SUMMARY

The inventive concept provides a virtual token-based payment providing system, a virtual token generation device, a virtual token verification server, a virtual token-based payment providing method, and a virtual token-based payment providing program that may search for an actual card number based on a virtual token, which is not redundant regardless of a usage time point and a user, for identifying a virtual token generation means and may be used without performing wireless communication after the actual card number is registered first.

The technical problems to be solved by the present inventive concept are not limited to the aforementioned problems, and any other technical problems not mentioned herein will be clearly understood from the following description by those skilled in the art to which the inventive concept pertains.

According to an exemplary embodiment, a virtual token-based payment providing method includes receiving, by a virtual token verification means, a virtual token provided by a virtual token generation means from a payment terminal, extracting, by the virtual token verification means, a plurality of detailed codes included in the virtual token, searching, by the virtual token verification means, for the actual card number based on the plurality of detailed codes, and transmitting the found actual card number to a payment settlement service server or a financial company server. The virtual token is matched with an actual card number by the virtual token generation means and then is generated. Each of the virtual token verification means and the virtual token generation means includes the same virtual token generation function. The virtual token generation means receives the virtual token generation function to store the virtual token generation function in the virtual token generation means upon registering the actual card number to use a virtual token service and generates and outputs the virtual token matched with a payment request time point without communication with the virtual token verification means at a payment request time point of a user. The plurality of detailed codes include a first code and a second code, which are used to search for a storage location of the actual card number in the virtual token verification means. The first code and the second code are changed and generated by a detailed code generation function in the virtual token generation function for each unit count, and the unit count is set to a specific time interval and is changed as the time interval elapses.

Moreover, according to another embodiment, the virtual token further includes a fixed code. The fixed code is combined at a predetermined location in the virtual token, and includes a code for determining a card issuer or a card type corresponding to the actual card number or a code for identifying whether to correspond to the virtual token.

Also, according to another embodiment, the virtual token verification means includes a storage location search algorithm for an individual card type. The searching for the actual card number includes selecting a specific storage location search algorithm for a specific card type based on the fixed code in the virtual token when the virtual token normally generated at a specific unit count is received and extracting the actual card number at the storage location found by applying the first code and the second code to the selected storage location search algorithm. The storage location search algorithm moves the storage location of the actual card number to a location corresponding to the first code and the second code of a specific count or searches for a fixed storage location of the actual card number by the first code and the second code of the specific count.

Furthermore, according to another embodiment, the first code is to set a start point of storage location search, and the second code is to set a search path from the start point to the storage location depending on a specific search method.

In addition, according to another embodiment, the first code and the second code are generated based on a count obtained by adding a virtual security code at an actual card number registration time point or a payment request time point. The virtual security code is a code value a specific number of digits generated through an OTP function based on a unique value of the virtual token generation means and a card security code, and is not separately provided from the virtual token generation means to the virtual token verification means.

Moreover, according to another embodiment, the method further includes verifying, by the virtual token verification means, whether the virtual token generation means normally issue the virtual token, using a generation virtual security number calculated based on a time value within a specific range from a time point when the second code and the virtual token are received.

Also, according to another embodiment, the storage location search algorithm moves a pointer on a single track based on the first code and the second code. The searching for the actual card number includes moving the pointer to a point on a track corresponding to the first code within the virtual token received from the virtual token generation means, setting a location corresponding to the first code to a search start point and returning the track by a number of counts corresponding to the second code to search for a point matched with the storage location of the actual card number, and extracting the actual card number included in the storage location of the actual card number.

Furthermore, according to another embodiment, the receiving of the virtual token includes receiving, by the virtual token verification means, the virtual token from the payment settlement service server as a virtual token payment is selected in the payment terminal by the user in a store by the virtual token or it is determined, by a payment settlement service server, that a code is the virtual token, based on a type of the code received from the payment terminal or information included in the code.

In addition, according to another embodiment, the receiving of the virtual token includes receiving, by the virtual token verification means, the virtual token from the payment terminal as the virtual token generation means accesses a payment page in a store to enter the virtual token. The payment page in the store includes a first interface for entering the virtual token and a second interface for entering order information, as a page provided when an Intranet network in the store is accessed.

Moreover, according to another embodiment, the method further includes receiving the virtual token corresponding to a count at which a request for payment cancellation is made to the virtual token generation means, searching, by the virtual token verification means, for the actual card number corresponding to the virtual token, and making a request for cancellation of a previous payment for the actual card number to the financial company server, when a payment cancellation request is received from a specific virtual token generation means.

According to an exemplary embodiment, a virtual token-based payment providing method includes receiving a virtual token generation function as a virtual token generation means registers an actual card number in a virtual token verification means, generating, by the virtual token generation means, a plurality of detailed codes matched with the payment request time point without performing communication with the virtual token verification means at a payment request time point of a user, generating, by the virtual token generation means, a virtual token by combining the plurality of detailed codes, and outputting, by the virtual token generation means, the virtual token to an outside to provide the virtual token to a virtual token verification server. The virtual token generation function corresponds to a storage location search algorithm in which the actual card number is stored in the virtual token verification means. The storage location search algorithm moves a storage location of the actual card number to a location corresponding to a plurality of detailed codes of a specific count or searches for a fixed storage location of the actual card number by the plurality of detailed codes of the specific count. The plurality of detailed codes include the first code and the second code, which are used to search for the storage location of the actual card number in the virtual token verification means. The first code and the second code are changed and generated by a detailed code generation function in the virtual token generation function for each unit count. The unit count is set to a specific time interval and is changed as the time interval elapses.

Moreover, according to another embodiment, the virtual token further includes a fixed code. The fixed code is combined at a predetermined location within the virtual token, and includes a code for determining a card issuer or a card type corresponding to the actual card number or a code for identifying whether to correspond to the virtual token.

According to an exemplary embodiment, a program for providing a virtual token-based payment is stored in a medium to execute the above-described virtual token-based payment providing method in combination with a computer that is a piece of hardware.

According to an exemplary embodiment, a virtual token generation device includes a virtual token generation function reception unit receiving a virtual token generation function as an actual card number is registered in a virtual token verification means, a detailed code generation unit generating a plurality of detailed codes matched with a payment request time point without performing communication with the virtual token verification means at the payment request time point of a user, a virtual token generation unit generating a virtual token by combining the plurality of detailed codes, and a virtual token output unit outputting the virtual token to an outside to provide the virtual token to a virtual token verification server. The virtual token generation function corresponds to a storage location search algorithm where the actual card number is stored in the virtual token verification means. The storage location search algorithm moves a storage location of the actual card number to a location corresponding to a plurality of detailed codes of a specific count or searches for a fixed storage location of the actual card number by the plurality of detailed codes of the specific count. The plurality of detailed codes include a first code, a second code, and a fixed code. The first code and the second code are used to search for the storage location of the actual card number within the virtual token verification means, and are changed and generated by a detailed code generation function in the virtual token generation function for each unit count. The fixed code is a code that is combined at the predetermined location in the virtual token and determines a card issuer or a card type corresponding to the actual card number. The unit count is set to a specific time interval and is changed as the time interval elapses.

According to an exemplary embodiment, a virtual token verification server searching for an actual card number based on a virtual token includes a virtual token reception unit receiving the virtual token provided by a virtual token generation means, a detailed code extraction unit extracting a plurality of detailed codes included in the virtual token, an actual card number search unit searching for the actual card number based on the plurality of detailed codes, and an actual card number transmission unit transmitting the found actual card number to a financial company server. The virtual token is matched with the actual card number by the virtual token generation means and then is generated. Each of the virtual token verification means and the virtual token generation means includes the same virtual token generation function. The virtual token generation means receives the virtual token generation function to store the virtual token generation function in the virtual token generation means upon registering the actual card number to use a virtual token service and generates and outputs the virtual token matched with a payment request time point without communication with the virtual token verification means at the payment request time point of a user. The plurality of detailed codes include a first code, a second code, and a fixed code which are used to search for a storage location of the actual card number in the virtual token verification means. The fixed code is a code that is combined at the predetermined location in the virtual token and determines a card issuer or a card type corresponding to the actual card number. The first code and the second code are changed and generated by a detailed code generation function in the virtual token generation function for each unit count. The unit count is set to a specific time interval and is changed as the time interval elapses.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
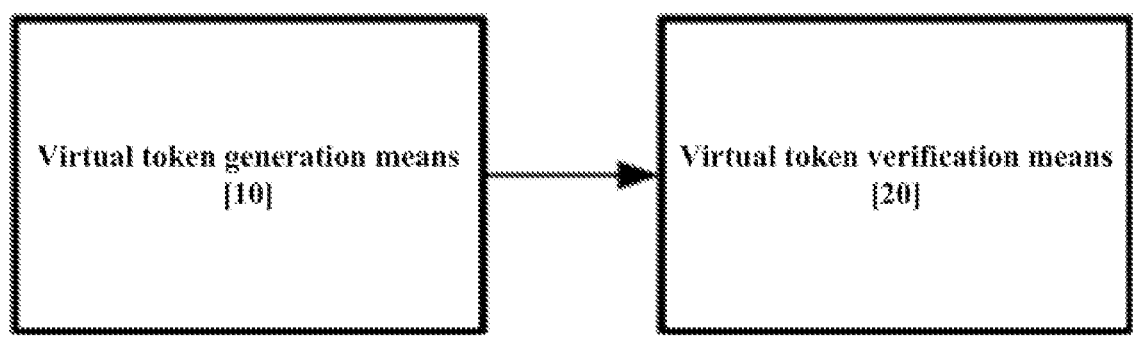
FIG. 1 is a configuration diagram of a virtual token-based payment providing system, according to an embodiment of the inventive concept.

Hereinafter, exemplary embodiments of the inventive concept will be described in detail with reference to the accompanying drawings. The above and other aspects, features and advantages of the invention will become apparent from the following description of the following embodiments given in conjunction with the accompanying drawings. However, the inventive concept is not limited to the embodiments disclosed below, but may be implemented in various forms. The embodiments of the inventive concept is provided to make the disclosure of the inventive concept complete and fully inform those skilled in the art to which the inventive concept pertains of the scope of the inventive concept. The same reference numerals denote the same elements throughout the specification.

Unless otherwise defined, all terms (including technical and scientific terms) used herein have the same meaning as commonly understood by those skilled in the art to which the inventive concept pertains. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

The terms used herein are provided to describe the embodiments but not to limit the inventive concept. In the specification, the singular forms include plural forms unless particularly mentioned. The terms "comprises" and/or "comprising" used herein does not exclude presence or addition of one or more other elements, in addition to the aforementioned elements.

In this specification, a 'character' is a component of a code and includes all or part of uppercase alphabet characters, lowercase alphabet characters, numerals, and special characters.

In this specification, a 'code' refers to a string of characters.

In this specification, a 'card number' is used for a financial transaction such as a payment, or the like and refers to the number issued to a card and delivered to a card issuer in the case of a payment, the cancellation of a payment, or the like.

In this specification, an 'actual card number' is the number issued by the card issuer to the card of a specific user. That is, the 'actual card number' may mean a number issued for a general real card, a mobile card, or the like.

In this specification, a 'virtual token' may be a card number temporarily generated to be connected to the actual card number and may be a code of specific digits composed of characters including numbers.

In this specification, a 'detailed code' refers to a part of codes included in the virtual token. That is, when the virtual token is generated by combining the separately generated a plurality of code, the detailed code refers to a respective code constituting the virtual token after the respective code is separately generated.

In this specification, the 'unit count' is a unit set to a specific time interval and is defined to change as the time interval elapses. For example, 1 count may be used after being set to a specific time interval (e.g., 1.5 seconds).

In this specification, a 'virtual token generation function' refers to the function used to generate the virtual token.

In this specification, a 'smart card' refers to a card capable of changing and outputting a card number.

In this specification, 'cloud movement' means that an object performs both rotational and translational movements. That is, the 'cloud movement' moves while performing both rotational and translational movements, and means that each point of the rotating object moves in contact with the moving axis sequentially.

In this specification, a 'payment settlement service server' includes all of the servers of the operator that connects or assists the payment service between a virtual token generation device and a store terminal device or between a virtual token verification server or a financial company server. That is, the payment settlement service server may correspond to all of a payment gateway (a service operator that acts on behalf of the transactions with financial institutions on Internet), VAN, the server of Acquirer, or the like.

In this specification, a 'financial company server' refers to a server that determines whether a payment is approved, based on the actual card number.

Hereinafter, according to an embodiment of the inventive concept, the configuration of the actual card number will be described to explain the process of generating a virtual token to substitute the actual card number and the process of searching for an actual card number.

The 'actual card number' includes at least one of a card identification number, a card security code, or an expiration date. The card identification number is the code assigned to identify a card issuer, a card type, and a user of a card. Generally, the card identification number provided to a card has 15 or 16 digits. Moreover, in general, in the case of the card identification number of 16 digits, the first six digits constitute the issuer identification number (IIN) of the card; the digits from the seventh digit to the fifteenth digit constitute the code provided by each card issuer to each card depending on an arbitrary rule; the 16th digit is a value for verifying the card identification number by a specific formula.

The card security code is composed of the numbers on specific digits (e.g., 3 digits in the case of Visa or Master card and 4 digits in the case of AMEX card) printed on one side of the card, and is a code for determining whether the card number is normal. That is, in the case where the card security code has 3 digits and the card identification number has 16 digits, when 3-digit code being the card security code and 16-digit code being the card identification number are encrypted/decrypted depending on a predetermined rule and then the card is a normal card, when the corresponding value is matched. The card security code is referred to as a Card Verification Value (CVV) for Visa, Card Validation Code (CVC) for Master Card/JCB, and Confidential Identifier Number or Card Identification Number (CID) or American Express.

The expiration date refers to the date usable after which the actual card number is issued. Generally, the expiration date is composed of four digits having two digits for each year or month. Because the magnetic card includes the actual card number as it is, the whole card number may be leaked by only reading out the magnetic card. The use of magnetic cards has been recently restricted over the world, and the magnetic card is being converted into a high-security card like an IC card. For the purpose of applying other high-security methods, a new terminal needs to be installed or the magnetic card needs to be changed to be different from the conventional process. Accordingly, a method for preventing a card number leakage is needed while the same process is applied using the conventional actual card number. In particular, it is necessary to improve security while the conventional magnetic card reader is used as it.

Hereinafter, according to an embodiment of the inventive concept, a virtual token-based payment providing system, a virtual token generation device 100, a virtual token verification server 200, a virtual token-based payment providing method and a virtual token-based payment providing program will be described in detail with reference to drawings.

FIG. 1 is a configuration diagram of a virtual token-based payment providing system, according to an embodiment of the inventive concept.

Figure 2:
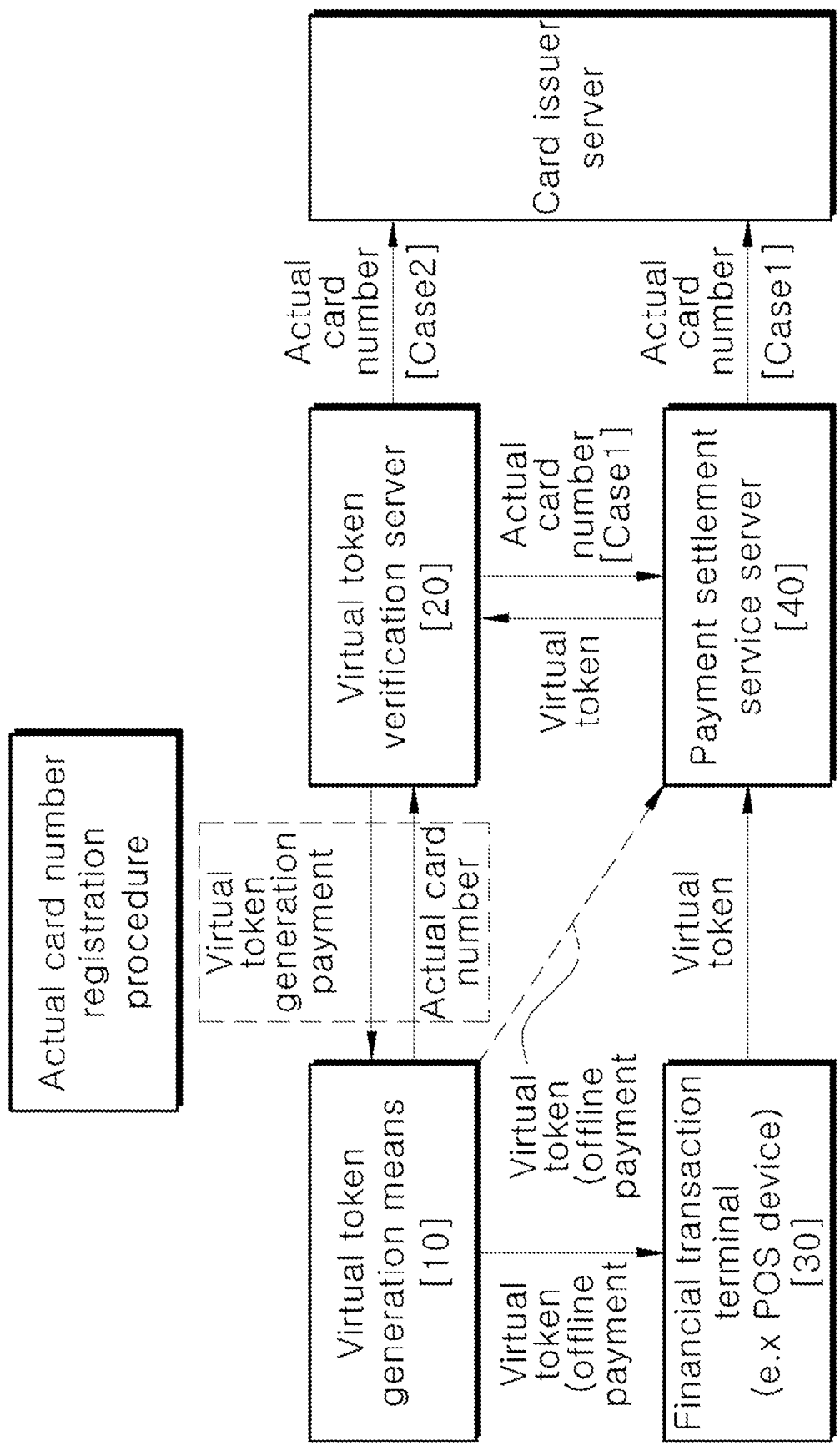
FIG. 2 is an exemplary view illustrating a procedure in which a virtual token is provided from a virtual token generation means to a virtual token operator server and a procedure in which an actual card number is provided from a virtual token operator server to a financial company server, according to an embodiment of the inventive concept.

FIG. 2 is an exemplary view illustrating a procedure in which a virtual token is provided from a virtual token generation means to a virtual token operator server and a procedure in which an actual card number is provided from a virtual token operator server to a financial company server, according to an embodiment of the inventive concept.

Referring to FIG. 1, a virtual token-based payment providing system according to an embodiment of the inventive concept includes a virtual token generation means 10 and a virtual token verification means 20.

The virtual token generation means 10 generates the virtual token including information through which the virtual token verification means 20 is capable of searching for an actual card number. That is, the virtual token generation means 10 generates the virtual token depending on a virtual token generation function. At this time, because the virtual token verification means 20 searches for an actual card number based on the virtual token, the virtual token generation means 10 may not store the actual card number. In this way, the actual card number may be prevented from leaking through the hacking of the virtual token generation means 10. The detailed description about the virtual token generation function will be given later.

The virtual token verification means 20 searches for the actual card number based on the virtual token received from the virtual token generation means 10. The virtual token verification means 20 stores the virtual token generation function the same as the virtual token generation means 10 to search for the actual card number from the virtual token received from the virtual token generation means 10. The detailed description about the method in which the virtual token verification means 20 searches for the actual card number based on the virtual token will be given later.

Furthermore, the virtual token verification means 20 verifies whether the virtual token is a code normally generated by the virtual token generation means 10. The detailed description about the method in which the virtual token verification means 20 determines whether a virtual token is normal will be given later.

The virtual token verification means 20 may receive the virtual token from the virtual token generation means 10 in various manners.

According to an embodiment, when the virtual token generation means 10 provides the virtual token to a payment terminal in various output manners, the virtual token generation means 10 may make an offline payment; a payment settlement service server may receive the virtual token from the payment terminal and then may transmit the virtual token to the virtual token verification means 20. When the virtual token generation means 10 makes an online payment, the virtual token generation means 10 transmits the virtual token to the payment settlement service server via the program connected to the payment settlement service server and the payment settlement service server transmits the virtual token to the virtual token verification means 20.

The payment settlement service server identifies that the code received in various manners is the virtual token and then transmits the code to the virtual token verification server. According to an embodiment, the payment settlement service server may receive data (i.e., payment means type data) into which the fact that the code is the virtual token of a specific service upon making a payment is entered, from the payment terminal; the payment settlement service server may identify that the received code is the virtual token, based on the payment means type data selected by a user from a payment interface upon making an online payment and then may transmit the received code to the virtual token verification server.

In particular, in the case where an offline payment is performed, as illustrated in FIG. 2, when a POS device 30 makes a payment through the virtual token generation means 10 (e.g., a mobile terminal equipped with a virtual token generation program), the virtual token verification means 20 may receive the virtual token from a payment settlement service server 40 that receives the virtual token from the POS device 30. Afterward, the virtual token verification means 20 (i.e., the virtual token service server) searches for an actual card number based on the virtual token and then delivers the actual card number to a card issuer server, directly or via a payment settlement service server. That is, the card issuer server may make a payment with the actual card number using the conventional payment process without separately modifying the system. Moreover, as described later, when the virtual token is generated as a code having a length the same as the length of the actual card number, a virtual token-based payment providing method according to an embodiment of the inventive concept may be applied to a process (i.e., the conventional virtual token-based service process) proceeding from the virtual token generation means 10 to a server including the virtual token verification means 20 without changes.

In particular, when the online payment is performed, the virtual token generated by the virtual token generation device 100 may be directly input (e.g., the virtual token is entered into a web page or a payment page of an application) to a mobile terminal connected to the virtual token verification server 200 through communication and then the virtual token verification server 200 may receive the virtual token. At this time, the virtual token verification means 20 may receive the virtual token from another server (e.g., the payment settlement service server) receiving the virtual token from the virtual token generation means 10.

Furthermore, according to another embodiment, a payment settlement service server may determine that a virtual token is correct, based on a fixed code placed at the digit of an issuer identification number. For example, as a virtual token uses the separate fixed code matched with the issuer identification number of a specific card type, a PG server may recognize the virtual token, using only the fixed code. That is, as described later, the fixed code may be used for a procedure in which the virtual token verification server searches for the storage location search algorithm of a card type corresponding to the virtual token and a procedure in which the PG server determines whether the received code corresponds to the virtual token.

Moreover, according to an embodiment, each of the virtual token verification means 20 and the virtual token generation means 10 includes the same virtual token generation function. As each of the virtual token verification means 20 and the virtual token generation means 10 includes the same virtual token generation function, the virtual token verification means 20 may properly extract a plurality of detailed codes from the virtual token generated by the virtual token generation means 10. Moreover, the virtual token verification means 20 may verify whether the received virtual token is generated and received by the normal virtual token generation means 10. That is, after the virtual token verification means 20 generates a code (i.e., a virtual token or a specific detailed code) in a condition the same as the condition in the case of the virtual token generation means 10, the virtual token verification means 20 may perform verification by comparing the code (i.e., a virtual token or a specific detailed code) received by the virtual token generation means 10.

Figure 3:
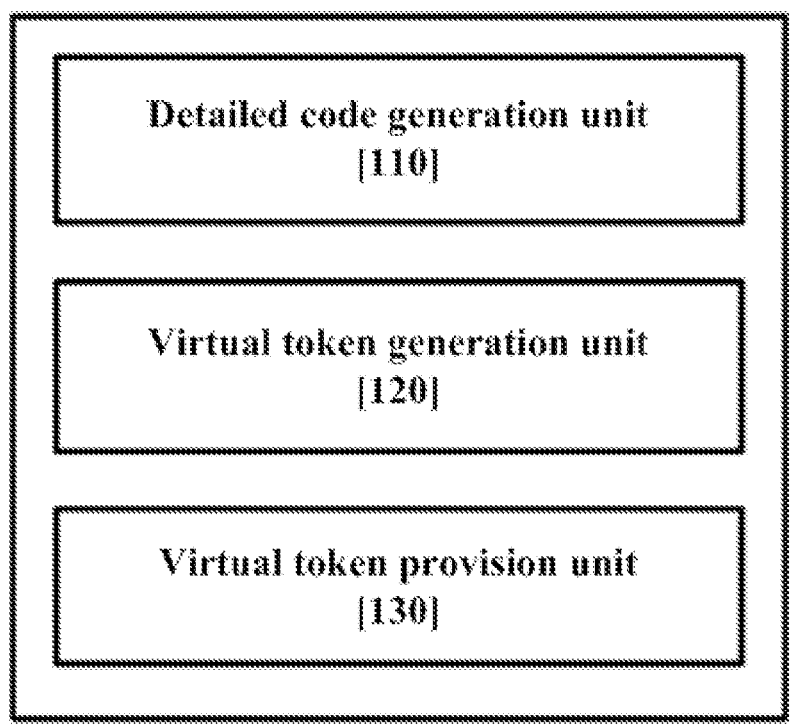
FIG. 3 is a configuration diagram of a virtual token generation device, according to an embodiment of the inventive concept.

FIG. 3 is a configuration diagram of a virtual token generation device 100, according to another embodiment of the inventive concept.

Figure 4A:
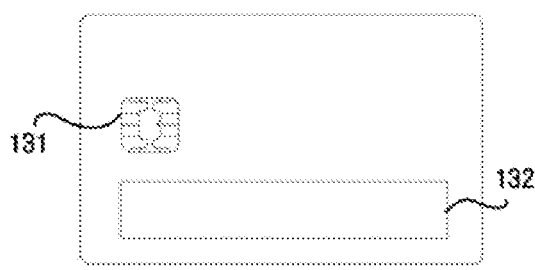
FIGS. 4A to 4C are exemplary diagrams of a virtual token generation device, according to an embodiment of the inventive concept.
Figure 4B:
Figure 4C:

FIGS. 4A to 4C are exemplary diagrams of a virtual token generation device, according to an embodiment of the inventive concept.

Referring to FIG. 3, according to another embodiment of the inventive concept, the virtual token generation device 100 includes a detailed code generation unit 110, a virtual token generation unit 120, and a virtual token provision unit 130.

According to embodiments of the inventive concept, the virtual token generation device 100 may be a device, in which the program corresponding to the virtual token generation means 10 is embedded or in which a program corresponding to the virtual token generation means 10 is installed. For example, the virtual token generation device 100 may be a smart card equipped with the program corresponding to the virtual token generation means 10. Moreover, for example, the virtual token generation device 100 may be a mobile terminal in which an app card application corresponding to the virtual token generation means 10 is installed or a mobile terminal equipped with a specific virtual token program. In addition to the above-described illustration, the virtual token generation device 100 may be a device that generates and transmits a virtual token.

The virtual token generation unit 120 may generate the virtual token by combining one or more detailed codes. According to an embodiment, the virtual token may be generated by combining a plurality of detailed codes depending on a specific rule. The virtual token generation function includes the rule (i.e., the detailed code combining function) that combines a plurality of detailed codes.

Various methods may be applied to the method of generating a single virtual token by combining the plurality of detailed codes. As the example of the detailed code combining function, the virtual token generation unit 120 may generate the virtual token in the manner of alternately positioning the first code of N-digits and the second code of N-digits. Furthermore, for another example, the detailed code combining function may be a function that combines the second code behind the first code. As the length of the detailed code included in a virtual function increases, the detailed code combining function may be generated variously.

The detailed code generation unit 110 may generate one or more detailed codes. The virtual token generation function includes each detailed code generation function. For example, the virtual token generation function generates a plurality of detailed codes, using a plurality of detailed code generation functions and generates a virtual token, using the detailed code combining function to combine the plurality of detailed codes.

In an embodiment, the detailed code generation unit 110 includes a first function and a second function as detailed code generation functions to generate a first code and a second code. The first code and the second code may have the correlation for searching for the storage location of the actual card number in the virtual token verification means 20. However, the virtual token generation device 100 may only include the first function to generate the first code and the second function as the detailed code generation functions to generate the second code to improve security, and may not include the data about the correlation between the first code and the second code.

Moreover, according to another embodiment, the virtual token may include the unchanged fixed code for distinguishing groups, together with a plurality of detailed codes. The virtual token verification means 20 may include several virtual token generation functions corresponding to several groups (e.g., a plurality of card issuers and card types), respectively; when the virtual token is received from the virtual token generation device 100, the virtual token verification means 20 needs to search for the actual card number based on the virtual token generation function of the group to which the corresponding virtual token generation device 100 belongs. When the whole code includes only the detailed code newly generated whenever an unit count elapses without including the fixed code, the group (e.g., the card issuer and the card type corresponding to the virtual token generated by the virtual token generation device) to which the virtual token generation device 100 belongs may not be determined without separate information. Accordingly, the virtual token generation device 100 includes the unchanged fixed code for identifying a group.

For example, when the virtual token generation function is assigned for each card type of a specific card issuer, the virtual token generation device 100 may use 6 digits indicating the card issuer and the card type, in the preceding numbers of the card number, as the fixed code and the virtual token verification means 20 may identify the specific card issuer and the specific card type to which the virtual token generation function the same as the virtual token generation device 100 is applied. That is, the fixed code refers to a code for determining the card issuer or the card type corresponding to the actual card number.

Moreover, according to another embodiment, the fixed code includes information or a code for identifying that the virtual token is correct. When only the virtual token is received, because the payment settlement service server (e.g., a VAN server or a PG server) or a payment terminal (e.g., a kiosk device or a POS device) does not determine whether a code is an actual card number, a virtual card number used after a financial company server directly matches the virtual card number with the actual card number, or a virtual token verified by the virtual token verification means, the virtual token generation means 10 includes information or a code for identifying the virtual token in the fixed code. For example, the virtual token generation means 10 may correspond to an issuer identification number within the actual card number of a user and may utilize a code capable of identifying a virtual token, as the fixed code. For example, a new code matched with the issuer identification number may be assigned to the fixed code using 6 digits corresponding to the issuer identification number within the actual card number and may be utilized. At this time, the virtual token verification means 20 may store the matching relationship between the fixed code and the issuer identification number in the same manner as the virtual token generation means 10 and then may grasp the card issuer and the card type of the actual card number based on the fixed code upon receiving the virtual token.

Moreover, the fixed code may be combined at the predetermined location within the virtual token. When the virtual token generation function is assigned for each card type group, the virtual token verification means 20 may extract the fixed code from the virtual token and then may determine a card type group. Accordingly, the fixed code may be combined at predetermined location (e.g., a location the same as the issuer identification number of the actual card number) within the virtual token so as to be detachable without the separate function.

Moreover, according to an embodiment, the virtual token generation device 100 may generate the detailed code so as to be the code of the same digits as the actual card number by combining a plurality of detailed codes and the fixed code. The virtual token generation device 100 needs to generate a code having the same digits as the actual card number as the virtual token, for the purpose of using the virtual token while the conventional financial transaction system (e.g., when the payment is made in a store, a POS device and a VAN server) is maintained as it is. To this end, the virtual token generation device 100 utilizes the digits of a plurality of detailed codes by dividing digits other than the fixed code for determining the card issuer and the card type of the corresponding card issuer. For example, when the actual card number has the card identification number of 16 digits and includes the first code and the second code as the detailed code, the virtual token generation device 100 may generate the first code and the second code, each of which has 5 digits, by identically dividing 10 digits other than the fixed code of 6 digits among 16 digits. Afterward, the virtual token generation unit to be described later may combine the first code and the second code depending on the specific rule and then may combine the fixed code with the front portion of the card identification number of the actual card number to generate the card identification number of the virtual token.

Moreover, for example, the virtual token composed of the detailed code may be generated using the digits of the card identification number of the card number and an expiration date That is, in the card identification number of 16 digits and the expiration date of 4 digits, the virtual token generation device 100 may maintain 6 digits corresponding to the issuer identification number of the actual card number as the fixed code and then may allocate the remaining 14 digits to a plurality of detailed codes. The detailed code generation unit may generate the detailed code matched with each of the allocated digits.

Moreover, for example, the virtual token generation device 100 may utilize the card identification number, the expiration date, and the card security code of the actual card number as the digit to be allocated to the detailed code in the virtual token. For example, the virtual token generation device 100 may maintain 6 digits corresponding to the issuer identification number of the actual card number as the fixed code and may allocate the remaining 10 digits of the card identification code, 4 digits of the expiration date, and 3 digits of the card security code to each detailed code as the digit.

Moreover, for example, the virtual token generation device 100 may express the detailed code and the fixed code of the virtual token, using only the portion of the card identification number. At this time, the virtual token generation device 100 may differently allocate the number of digits to a plurality of detailed codes. That is, when the virtual token includes the fixed code, the first code, and the second code and generates the fixed code, the first code, and the second code by using only the number of digits of the card identification number, the virtual token generation device 100 may divide 9 digits among the number of digits other than 6 digits to be allocated to the fixed code into the first code and the second code and then may allocate the divided result. In all of the case where the card identification number has 15 digits and the case where the card identification number has 16 digits, the virtual token generation function may allocate only 9 digits of the card identification number to the first code and the second code. For example, the virtual token generation function may allocate 6 digits among 9 digits to the first code and may allocate 3 digits among 9 digits to the second code. As such, when codes constituting the virtual token is expressed using only the portion of the card identification number in the whole card number, the number of texts to be entered may be reduced when a user needs to directly enter the card number. Moreover, the virtual token generation device 100 may utilize the portions of the expiration date and the card security code for other purposes to improve security.

Moreover, according to an embodiment, the virtual token further includes a virtual security code. For example, the virtual token includes a plurality of detailed codes and the virtual security code. The security code of the virtual token may be provided using the digit of the card security code (i.e., CVV or CVC) of the actual card number. That is, the virtual token generation device may allocate the digit of the card security code to the virtual security code of the virtual token and may allocate all or part of digits of the card identification number and the expiration date to a plurality of detailed codes so as to include the same number of texts as the actual card number used by the conventional financial transaction system.

The virtual security code is a code generated based on the specific security code generation function and is used to verify whether a virtual token is normal. The security code generation function generates the security code of the specific digits, using time data and the unique value of the virtual token generation means as a function value.

An example of a procedure of determining whether a virtual token is normal, using the virtual security code is as follows. The virtual token verification means 20 may receive the unique value (e.g., the chip unique value in the smart card, the unique value of a smartphone installed in an app card, or the like) of the virtual token generation device 100 upon registering the actual card number to store the unique value in the storage location of the actual card number or may store the unique value in a separate storage space connected to the storage location of the actual card number. When the virtual token generation device 100 generates the virtual token, with which the virtual security code is combined, to provide the virtual token to the virtual token verification means 20, the virtual token verification means 20 may obtain time data at which the virtual token is generated, based on the detailed code, may extract the unique value of the specific virtual token generation device 100 stored therein, may apply the extracted unique value together with the time data to the virtual security code generation function (e.g., OTP function), and may generate the virtual security code. The virtual token verification means 20 may determine whether the virtual security code (i.e., the reception virtual security code) received by the virtual token generation device 100 is the same as the virtual security code (i.e., the generated virtual security code) calculated using the virtual security code generation function stored therein. Because there is a difference between a time point at which the virtual token generation device 100 generates a virtual token and a time point at which the virtual token verification device 200 receives the virtual token, the virtual token verification device 200 may calculate the virtual security code (i.e., OTP number) within a specific time range (e.g., from a time point, at which the virtual token is received, until a specific count) in consideration of time delay and may determine whether there is a value the same as the reception virtual security code received from the virtual token generation device 100. When the reception virtual security code is the same as the generation virtual security code, the virtual token verification means 20 may determine whether the virtual token is normal and then may provide the actual card number.

For example, the virtual security code may be generated to have the number of digits corresponding to the card security number. That is, the virtual token generation device 100 may generate 3 digits or 4 digits corresponding to the card security number as the virtual security code, using the virtual security code generation function; when the virtual security code is entered as the card security number upon using a card, the virtual token verification means 20 may verify the virtual security code.

Moreover, for another example, the virtual security code generation function may generate the code of '1' digits ('1' is a natural number) changed for each count to apply the code as a function value together. That is, the virtual security code generation function may include a random code generation function (e.g., the OTP function to generate a code of '1' digits) of '1' digits.

Furthermore, in an embodiment, when the virtual token is generated through the combination according to the specific rule of the first code and the second code, the first code and the second code may have a role of searching for the storage location at which the actual card number is stored. For example, the first code is set to the start point of the storage location search, and the second code is set to the search path from the start point to the storage location depending on a specific search method. That is, when the virtual token generated normally for each unit count is provided from the virtual token generation device 100, the virtual token verification device 20 determines that a point moving along the search path corresponding to the second code from the search start point corresponding to the first code is the storage location of the actual card number. The detailed method of searching for the storage location based on the first code and the second code constituting the virtual token will be described later.

As an embodiment of a method in which the detailed code generation unit 110 generates the detailed code, the detailed code generation unit 110 generates a new detailed code for each unit count, and thus the virtual token generation device 100 generates a new virtual token for each unit count. The virtual token newly generated for each unit count is not generated redundantly. In particular, the detailed code generation unit 110 may be configured such that the virtual token newly generated for each unit count is not redundantly generated between users belonging to a specific group as well as not being generated during a specified duration for a specific user or specific the virtual token generation device 100.

As the detailed embodiment of preventing the virtual token from being generated redundantly, when generating the first code or the second code of N digits by using M characters, the detailed code generation function included in the virtual token generation function may generate $M^N$ codes as the first code or the second code and may match each code for each count from the initial time point at which the detailed code generation function is operated. For example, when setting the unit count to one second, the detailed code generation function matches $M^N$ different codes every second from the first driven time point. Moreover, when the period of using the specific detailed code generation function or the usage period (e.g., the expiration date of a smart card generating the virtual token) of the virtual token generation device 100 is set to be shorter than the time length (e.g., $M^N$ seconds in the case where 1 count is 1 second) corresponding to $M^N$ count, the first code or the second code is not generated redundantly to be the same as each other during the usage period. That is, when the count increases with time, in the case where a user requests the virtual token generation device 100 to generate a virtual token at a specific time point, the virtual token generation device 100 may generate a code value matched with a count corresponding to a specific time point, as the first code or the second code.

In particular, when alphabetic uppercase characters and numbers from 0 to 9 are used as characters capable of being included in a code (i.e., using 36 characters) and 6 digits are respectively assigned to first and second codes by using the digits of the card identification number and the expiration date of the actual card number, the virtual token generation device 100 may provide $36^6$ codes as the first code and the second code. At this time, the virtual token generation device 100 may provide the first code and the second code, which are changed for each count, by matching each code for each count.

As the detailed embodiment of preventing the virtual token from being generated redundantly, when the usage period of the virtual token generation device 100 elapses, the virtual token, the usage period of which is different from the previous usage period may be generated by changing the function (i.e., the first function or the second function) to generate the first code or the second code or by changing the matching relationship between the first code and the second code. In the case where the first code generated by the first function and the second code generated by the second function are combined in the virtual token, when the first code generation function or the second code generation function are changed, the virtual token generation device 100 may apply the virtual token generation function to generate the virtual token different from the previous period to a new usage period as the order in which the first code or the second code appears differs from the order in the previous usage period. Furthermore, the virtual token generation device 100 may select the first function and the second function such that a code the same as the virtual token used in the previous usage period does not appear as the virtual token of each count in a new usage period (i.e., such that the matching relationship between the first code generated depending on the first function and the second code generated depending on the second function is not included in the matching relationship included in the previous usage period, at all counts in the new usage period). That is, after the usage period capable of applying $M^N$ codes once elapses, the virtual token generation function in a new usage period, which overlaps with the previous usage period and in which the virtual token is not generated may be applied through adjusting of updating the virtual token generation function.

At this time, the virtual token generation means 10 and the virtual token verification means 20 may store a rule of updating a virtual token generation function. That is, the virtual token generation means 10 and the virtual token verification means 20 may store an order or rule for applying the plurality of first and second functions to each usage cycle.

Furthermore, as the detailed other embodiment of preventing the virtual token from being generated redundantly, one of the first code or the second code included in the virtual token may be generated by reflecting a value (i.e., a device identification value) present for each virtual token generation device 100 at the same time point such that the same virtual token is not generated between users belonging to the same group at the same time point. In an embodiment, the device identification value may be the elapsed time (or the number of counts) from the time point (e.g., the time point at which the detailed code generation function starts to be applied to the specific virtual token generation device 100 after a specific time elapses from the first time point at which the specific detailed code generation function is driven in the virtual token verification means 20), at which the specific virtual token generation device 100 is included in a group to which the specific detailed code generation function is applied, to the present. In the case where a plurality of virtual token generation devices 100 are included in a single group, when the counts, each of which allows the virtual token generation device 100 to belong to the corresponding group, are not the same as one another (i.e., the virtual token generation devices 100 do not belong to the corresponding group at the same time), the time elapsing from a time point (or count), at which the virtual token generation devices 100 belong to the group, to a specific time point may be different for the respective virtual token generation devices 100. Accordingly, at least one of the detailed code generating functions may allow the virtual tokens generated by each of the virtual token generation devices 100 to be different for each time point, using the time elapsing from the time point (or count), at which the virtual token generation devices 100 belong to the card type group, to a specific time point as a device identification value. As such, the virtual token verification means 20 may distinguish the virtual token generation device 100 only by receiving the virtual token without separately receiving the data for distinguishing the user.

For example, when the virtual token generation device 100 is a mobile terminal in which a program is capable of changing the output token number, the specific card type of a specific card issuer is set to a single group and a specific virtual token verification means (e.g., when there is a virtual token verification means within the virtual token verification server for each card type and a single storage location search algorithm is included in the virtual token verification means) or a storage location search algorithm (e.g., when the virtual token verification server is composed of a virtual token verification means and the storage location search algorithm is included in the virtual token verification means for each card type) within the virtual token verification server is driven with respect to the corresponding group. When a first user requests the first virtual token generation device 100 (i.e., the virtual token generation device 100 of the first user) to register the actual card number (e.g., a procedure of transmitting the actual card number to the virtual token verification server and then receiving the virtual token generation function) at a time point elapsing by 'A' time from a point in time when the virtual token verification means 20 is driven and when a second user requests the second virtual token generation device 100 (i.e., the second virtual token generation device 100) to register the actual card number at a time point elapsing by 'B' time ('B' is a value time greater than 'A') from a point in time when the virtual token verification means 20 is driven, in the first virtual token generation device 100 and the second virtual token generation device 100, the time length elapsing from a point in time when each user registers a card may be different at 'C' time ('C' is a value time greater than 'B') when the virtual token generation is requested from the first user and the second user. Accordingly, the detailed code generation function applies the time length elapsing from a point in time when the actual card number is registered in the virtual token service, to each of the virtual token generation devices 100 as a variable, thereby preventing the same virtual token from being generated at the same time point.

Moreover, because the time length elapsing from the time point, at which a specific virtual token generation device 100 belongs to a specific group, continuously increases with time, the detailed code (e.g., the second code) generated by the specific virtual token generation device 100 is not generated as the same value but is continuously generated as a different value.

Furthermore, as the detailed other embodiment of preventing the virtual token from being generated redundantly, such that a redundant virtual token is not generated in the whole period regardless of the user, the first code may be set as a code value corresponding to a time point (or count) at which the generation of a virtual token is requested, among codes matched for each count from an initial time point at which the first function is driven within the virtual token verification means 20, the second code may be set as a code value generated by reflecting a value (i.e., a device identification value) that always differently exists at the same time point for each of the virtual token generation devices 100, and the virtual token may be used as a code value obtained by combining the first code and the second code. Because the first code has a different code value for each count and the second code has a different code value for each of the virtual token generation devices 100 at the same time point, the virtual token obtained by combining the first code and the second code may be output as a different code value for all of the virtual token generation devices 100 at all-time points.

Furthermore, in another embodiment, one of a plurality of listing rules that lists M characters in ascending order may be applied to the virtual token generation function (or the detailed code generation function). That is, the virtual token generation device 100 (i.e., the virtual token generation means 10) may variously apply rules for listing M characters in ascending order, to the detailed code generation function included in the virtual token generation function. For example, the listing rule for listing uppercase alphabetic characters in ascending order may be the order of A, B, C, . . . , and Z that is the general order or may be the order of A, C, B, . . . , and Z. As the listing rule is changed by the virtual token generation function, the order in which the codes are matched sequentially is different for each count from the initial time point at which the virtual token generation function is operated. The virtual token verification means 20 may include and store the code generated depending on the same listing rule, which is matched with each count, or the same listing rule itself, in the virtual token generation function. Accordingly, the virtual token generation function for each group may include different detailed code combining functions or different character listing rules, to have different virtual token generation functions for each group.

The virtual token provision unit 130 may output the virtual token to the outside to provide the virtual token verification device 200 with the virtual token. The virtual token provision unit 130 may include various components capable of providing the virtual token to the outside. The virtual token provision unit 130 includes all or part of a wireless Internet module, a short range short range communication module, an IC chip 131, a magnetic field generation unit, a display unit 132, and the like.

The wireless Internet module is a module for wireless Internet access and may be embedded in a mobile terminal 100 or may be attached on the mobile terminal 100. The wireless Internet technology may include Wireless LAN (WLAN) (Wi-Fi), Wireless broadband (Wibro), World Interoperability for Microwave Access (Wimax), High Speed Downlink Packet Access (HSDPA), long term evolution (LTE), Long Term Evolution-Advanced (LTE-A), or the like. For example, in the case where the virtual token generation device 100 is a mobile terminal in which an app card application being a virtual token generation means is installed, when a user purchases an item from a shopping application or a shopping website, the virtual token generation device 100 may transmit the virtual token to a payment settlement service server (i.e., the PG server 40) through wireless Internet communication.

The short range communication module refers to a module for short range communication. The short range communication technology may include Bluetooth, Bluetooth Low Energy (BLE), Beacon, Radio Frequency Identification (RFID), Near Field Communication (NFC), Infrared Data Association (IrDA), Ultra Wideband (UWB), ZigBee, or the like.

When the virtual token generation device 100 corresponds to a card for transmitting the virtual token to a POS device, the virtual token provision unit 130 may include a magnetic field generation unit or an IC chip. The magnetic field generation unit may transmit card data to a card reader by outputting the card data in the form of a magnetic signal. The magnetic field generation unit may include one or more magnetic cells that form a magnetic field through current flow and output the magnetic signal of card information. When the virtual token generation device has a card shape, the magnetic field generation unit may be provided such that the magnetic field generation unit is exposed on the upper or lower surface of a PCB plate along a long side to be adjacent to the specific long side of the PCB plate of the card. Moreover, when the virtual token generation device is a mobile terminal such as a smartphone, the magnetic field generation unit may be disposed on one side of the interior of a mobile terminal.

The IC chip 131 may be mounted in PCB and may exchange data by contacting the terminal of IC card reader. That is, the IC chip delivers the virtual token generated by the virtual token generation unit 120 to the IC card reader.

At this time, the display unit 132 may include at least one of a liquid crystal display, a thin film transistor-liquid crystal display, an organic light-emitting diode, a flexible display, and an E-paper.

The display unit may visually output the virtual token generated by the virtual token generation unit 120 to the outside. In this way, the user of the virtual token generation device 100 may visually identify the generated virtual token in real time and then may enter the visually identified virtual token into the virtual token verification means 20.

For example, as illustrated in FIGS. 4A to 4C, when the virtual token generation device is a smart card, the virtual token generation device may include a display unit capable of outputting the virtual token without outputting the card number on the card surface. Moreover, for example, when the virtual token includes the fixed code the same as the issuer identification number, the virtual token generation device 100 may output the issuer identification number on the card surface and may store only the digits of the remaining card number in the display unit. For example, the display unit may be an E-paper, an OLED, or the like or may be a 7-segment display provided at each position. Moreover, for example, when the virtual card generation device is a smartphone in which the app card application is installed, the display unit may be the display unit of the smartphone in which the app card application is executed and is displayed.

Moreover, the user may deliver the virtual token displayed in the display unit via various paths of a text message. Because the virtual token (in particular, the code generated while being changed continuously) is delivered such that the virtual token verification means 20 searches for the actual card number without transmitting the actual card number, the user may not be concerned about the leakage of the actual card number upon transmitting the code through the text message, or the like.

Moreover, the user may utilize the method of copying the virtual token displayed on the display unit and then pasting the virtual token on the payment page displayed on the screen. For example, in the case where a user who visits a specific store desires to place an order and to make a payment or desires to make an online payment, when the virtual token generation device is a mobile terminal in which a virtual token generation program is installed, the user may execute the virtual token generation program to copy the virtual token generated at the corresponding time point, and may enter the virtual token into the card number field of an offline payment page provided through the intra-net of the store or the page for an online payment.

Figure 5:
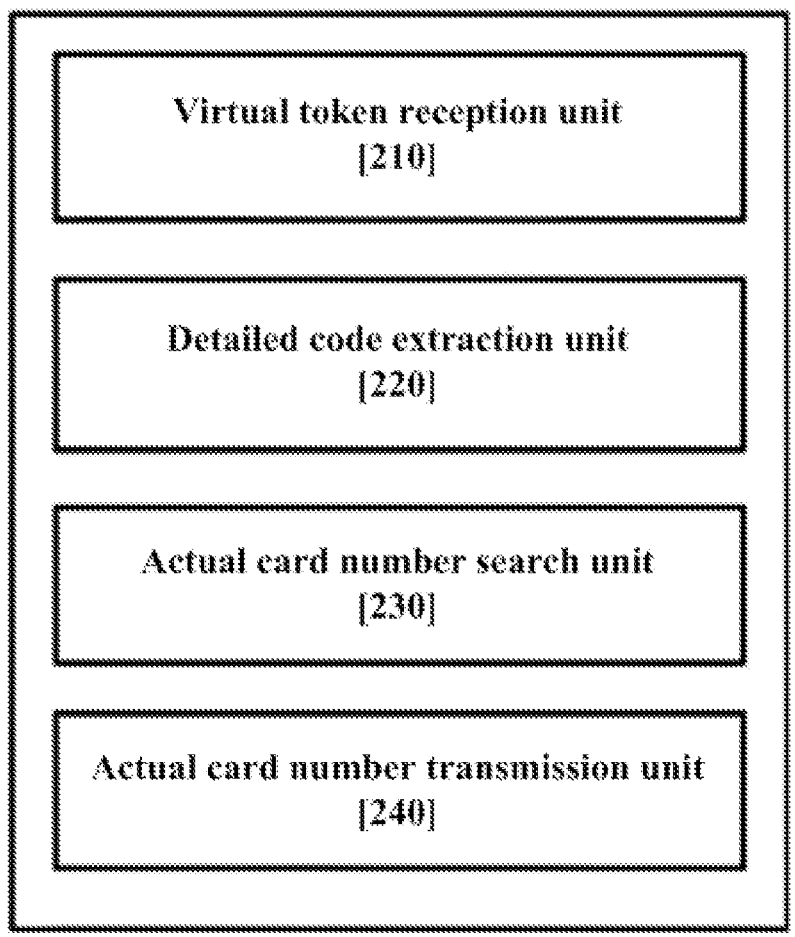
FIGS. 5 and 6 are configuration diagrams of a virtual token verification device, according to an embodiment of the inventive concept.

FIG. 5 is a configuration diagram of a virtual token verification device 200, according to an embodiment of the inventive concept.

Referring to FIG. 5, according to another embodiment of the inventive concept, a virtual token verification device 200 includes a virtual token reception unit 210, a detailed code extraction unit 220, an actual card number search unit 230, and an actual card number transmission unit 240. The virtual token verification device 200 may be a server of the operator providing a virtual token service. That is, the virtual token verification device 200 may be a server of a service operator that searches for the actual card number based on a virtual token capable of being used at the specific time point in place of the actual card number and then provides a financial company server with the actual card number to make a payment. In particular, in the case of an offline card payment, the virtual token verification device 200 receives the virtual token generated by the virtual token generation device 100, via a POS device and a payment settlement service server (i.e., a PG server). For example, when it is determined, based on the payment means selection input received by a payment terminal device or the fixed code in the virtual token, that the virtual token is received, the payment settlement service server may deliver the virtual token to the virtual token operator server (i.e., a virtual token verification server). Afterward, the virtual token verification server may search for the actual card number corresponding to the virtual token to provide the financial company server or the payment settlement service server with the actual card number.

When providing the actual card number to the payment settlement service server, the payment settlement service server may transmit the actual card number received by the virtual token verification server to the financial company server to make a payment. At this time, the payment settlement service server may transmit the actual card number and payment request information (e.g., payment amount) to the financial company server together.

When the virtual token verification server directly provides the actual card number to the financial company server, the virtual token verification server may receive the payment request information other than the virtual token from the payment settlement service server together with the virtual token and may transmit the actual card number found based on the virtual token and the payment request information to the financial company server together. At this time, the virtual token verification server may be a server operated by a financial company or may be a server of a company distinguished from the financial company. For example, when the virtual token verification server is the server operated by a financial company, the virtual token verification server may transmit the actual card number found through intra-net and the payment request information to the financial company server (i.e., the conventional payment server).

The virtual token reception unit 210 may receive the virtual token from the virtual token generation device 100. According to an embodiment, the virtual token reception unit 210 may receive the virtual token generated by the virtual token generation device 100, through the communication with another server (e.g., the payment settlement service server).

The detailed code extraction unit 220 extracts a plurality of detailed codes included in the virtual token. The virtual token may be generated by combining a plurality of detailed codes depending on the specific rule. The detailed code extraction unit 220 of the virtual token verification device

200 may include the detailed code combining function the same as the virtual token generation device 100 of a specific group, and thus the detailed code extraction unit 220 may extract a plurality of detailed codes from the virtual token by applying the detailed code combining function. For example, when the virtual token generation device 100 generates the virtual token obtained by combining two detailed codes (i.e., the first code and the second code), the detailed code extraction unit 220 may separate the first code and the second code by applying the detailed code combining function to the character string array of the virtual token.

The actual card number search unit 230 searches for the storage location of the actual card number based on the plurality of detailed codes. Various methods may be applied such that the actual card number search unit 230 searches for the storage location of the actual card number based on each detailed code. The actual card number search unit 230 may include the correlation between detailed codes to search for a storage location based on a plurality of detailed codes.

When the virtual token is composed of the first code and the second code, as an embodiment of having the correlation between detailed codes, the actual card number search unit 230 may determine a search start point corresponding to the first code and may search for the point, which is moved along the search path corresponding to the second code from the search start point, as the storage location of the actual card number. That is, the detailed code may include the first code for setting the start point of the storage location search and the second code for setting the search path from the start point to the storage location, depending on the specific search method.

Moreover, according to another embodiment, the virtual token generation means 10 (or the virtual token generation device 100) provides a new virtual token for each unit count, the virtual token verification device 200 may set the search start point and the search path based on the first code and the second code, which are changed for each count, to search for the storage location of the actual card number.

Furthermore, in another embodiment, for the purpose of searching for the storage location of the actual card number by using a plurality of detailed codes having the correlation, the actual card number search unit 230 may include the storage location search algorithm. The storage location search algorithm is an algorithm capable of being searching for the storage location when each detailed code included in the virtual token is applied. For example, when the storage location search algorithm includes the first code and the second code as a plurality of detailed codes, the storage location search algorithm may move the storage location of the actual card number to the location corresponding to the first code and the second code of the specific count or may search for the fixed storage location of the actual card number by the first code and the second code of the specific count.

For example, in the case where the virtual token includes the first code for determining the search start point of the storage location and the second code for presenting the storage location direction from the search start point, when the storage location search algorithm allows a direction to be changed to the direction corresponding to the second code at the point corresponding to the first code, the storage location search algorithm is an algorithm that adjusts the storage location at which the actual card number is matched with be positioned at the corresponding location. As the storage location search algorithm is used, even though the first code and the second code included in the virtual token are changed, the virtual token verification device 200 may search for the storage location of the actual card number or the point matched with the storage location. Various methods may be applied to the storage location search algorithm, and the detailed exemplification will be described later. However, the storage location search algorithm is not limited to the exemplification described below.

For example, as described later, referring to FIG. 8, when the storage location search algorithm a k-polygon ('k' is $M^N$) that performs cloud movement along a track in which $M^N$ codes corresponding to the first code are listed; when the vertex of the k-polygon moves while corresponding to a point at which a code is positioned on a first code track, each vertex of the k-polygon is matched with the storage location of the actual card number and the point corresponding to the first code track (e.g., the first track) and the k-polygon is the start point of the storage location search corresponding to the first code. At this time, the actual card number search unit 230 may apply the k-polygon to the cloud movement such that the vertex of the k-polygon is in contact with the point corresponding to the first code extracted by the detailed code extraction unit 220. In this way, the actual card number search unit 230 allows an angle to be changed from the location on the first track, which the k-polygon is contact with, to an angle (e.g., a specific angle obtained by dividing 180 degrees into $M^N$ pieces so as to face the vertex of the k-polygon) corresponding to a second code, the actual card number search unit 230 may search for the vertex of the k-polygon that is a storage location at which the actual card number corresponding to the virtual token is stored.

Figure 8:
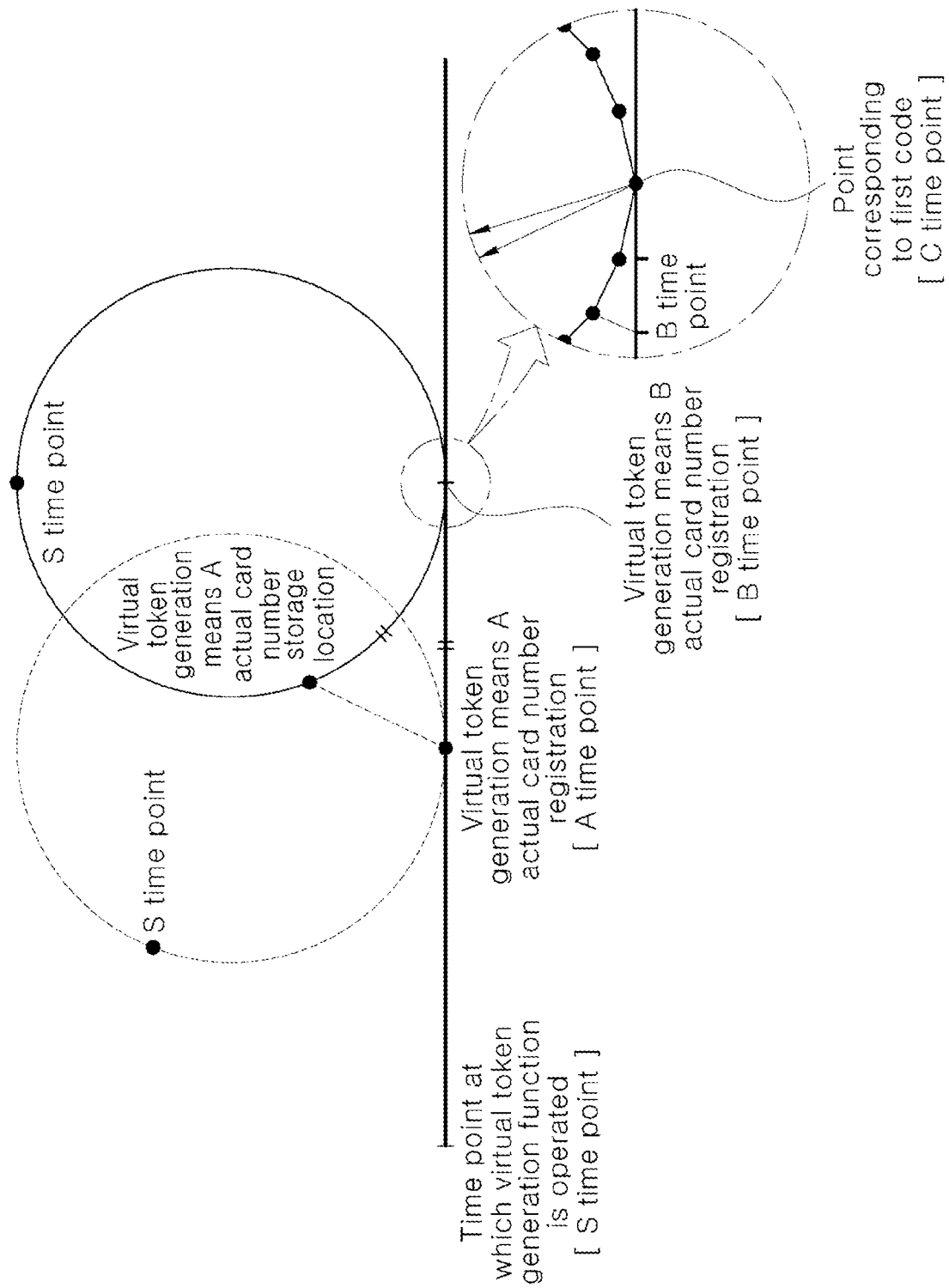
FIG. 8 is an exemplary view illustrating a storage location search algorithm searching for a storage location of an actual card number through cloud movement of a k-polygon, according to an embodiment of the inventive concept.

In particular, as illustrated in FIG. 8, the virtual token verification device 200 may perform cloud movement (i.e., each vertex of the k-polygon moves while sequentially being in contact with each point on the track) to the point corresponding to the first code on the k-polygon. Afterward, the virtual token verification device 200 allows the angle direction to be changed to the angle direction corresponding to the second code to search for the vertex corresponding to the storage location. For example, because 2 counts elapses after the actual card number is registered, the virtual token generation means B generates the second code, which applies 2 counts to the function value, and then provides a virtual token verification means. Because the virtual token verification means matches and stores (i.e., match and store the second code with the angle facing the n-th vertex on which the cloud movement is performed, by performing cloud movement on the second code, to which 'n' counts are applied, by 'n' counts of the k-polygon) the second code generated by the second function for each count at a point at which the k-polygon contacts a track, to an angle facing each vertex, the virtual token verification means may apply the angle corresponding to the second code to the point corresponding to the first code and then may search for the vertex the k-polygon corresponding to the storage location of the actual card number.

Moreover, for example, when the storage location search algorithm moves a pointer on a single track based on the first code and the second code, the virtual token verification device 200 may move a pointer to a point on the track corresponding to the first code in the virtual token received from the virtual token generation means, may set the location corresponding to the first code to a search start point, may return the track by the number of counts corresponding to the second code to search for a point matched with the storage location of the actual card number, and may extract the actual card number included in the storage location of the actual card number.

The actual card number transmission unit 240 transmits the actual card number extracted from the storage location to a payment settlement service server or a financial company server. That is, the actual card number transmission unit 240 may search for the actual card number to directly provide the financial company server with the actual card number or to provide the financial company server via the payment settlement service server, such that the financial company server is capable of making a payment depending on the existing method.

Figure 6:
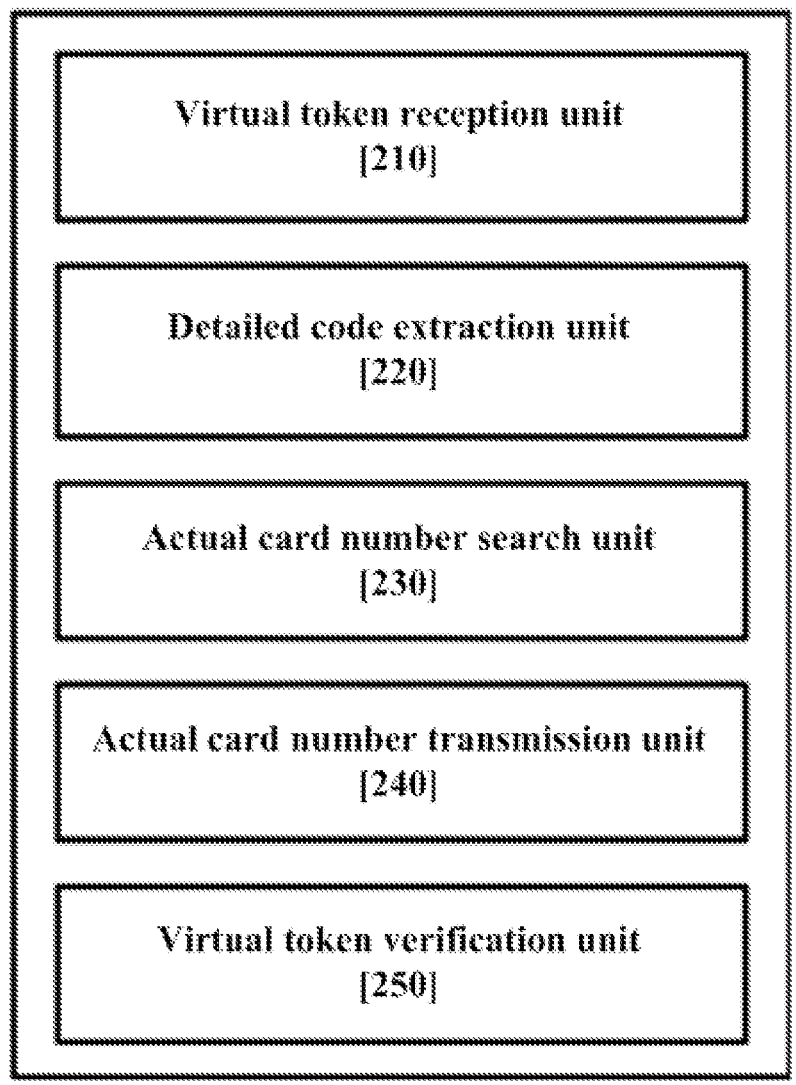

Moreover, according to another embodiment, as illustrated in FIG. 6, the virtual token verification device 200 further includes a virtual token verification unit 250. The virtual token verification unit 250 determines whether the virtual token received by the virtual token verification device 200 is authentic.

Figure 7:
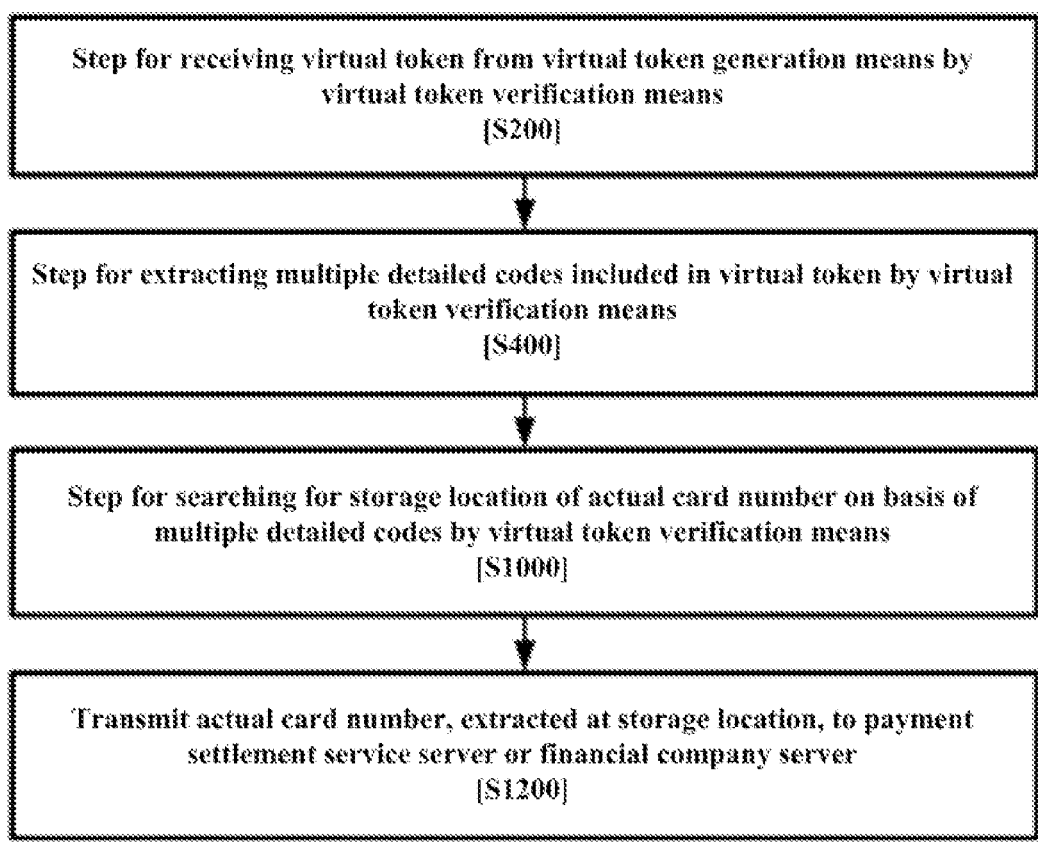
FIG. 7 is a flowchart of a virtual token-based payment providing method, according to an embodiment of the inventive concept.

FIG. 7 is a flowchart of a virtual token-based payment providing method, according to an embodiment of the inventive concept.

Referring to FIG. 7, a virtual token-based payment providing method according to an embodiment of the inventive concept includes a step S200 (a step for receiving a virtual token) for receiving a virtual token provided by a virtual token generation means, by a virtual token verification means, a step S400 for extracting multiple detailed codes included in the virtual token by the virtual token verification means, a step S1000 for searching for a storage location of an actual card number on the basis of the multiple detailed codes by the virtual token verification means (a step for searching for the actual card number), and a step S1200 for transmitting the actual card number extracted at the storage location, to a payment settlement service server or a financial company server. Hereinafter, the detailed description of each operation is provided. However, the detailed disclosure of the content described in the description process associated with the virtual token generation device 100 and the virtual token verification device 200 is omitted.

In operation S200, the virtual token verification means 20 receives the virtual token from the virtual token generation means 10 (a step of receiving a virtual token). The virtual token is generated by the virtual token generation device 100 or the virtual token generation means 10 and then is provided to the virtual token verification means 20. Upon registering the actual card number to use the virtual token service, the virtual token generation means 10 may receive the virtual token generation function to store the virtual token generation function in the inside and may generate and output the virtual token matched with the payment request time point at the payment request time point of a user without the communication with the virtual token verification means. That is, the virtual token generation means 10 may not store the actual card number but generate the virtual token corresponding to the corresponding time point without the procedure of the communication with the virtual token verification means 20.

The virtual token generated by the virtual token generation means 10 may be composed of a plurality of detailed codes. According to an embodiment, the virtual token may be generated by combining a first code and a second code. Each of the first code and the second code may be used for the virtual token verification means 20 to search for the location of the actual card number. For example, the first code may be a code for setting the start point of the storage location search of the actual card number in the virtual token verification means 20; the second code may be a code for setting the search path from the start point to the storage location in the specific search manner. The search method may be determined by a storage location search algorithm. The detailed description about the determination of the search method will be given in detail in the step S1000 for searching for the actual card number to be described later.

Moreover, the virtual token further includes the fixed code. The fixed code includes a code for determining the card issuer or the card type corresponding to the actual card number or a code for identifying whether to correspond to the virtual token. The fixed code is combined at the predetermined location within the virtual token. The above-described detailed description about the fixed code within the virtual token is omitted.

Moreover, according to another embodiment, when the virtual token generation function generates the first code or the second code of N digits using 'M' characters, the virtual token generation function includes a first function or a second function that provides $M^N$ different codes as the first code or the second code that is sequentially changed for each unit count. That is, the first function or the second function is a function that generates $M^N$ codes without duplication as the count increases; the first function or the second function generates specific one among $M^N$ codes at the count corresponding to the specific time point as the first code or the second code. In this way, the virtual token generation means 10 may not redundantly generate the same first code or second code within $M^N$ counts (i.e., the time length corresponding to $M^N$ counts) but generate a new detailed code (i.e., the first code or the second code) for each unit count to generate the new virtual token for each unit count.

In particular, when the virtual token generation function generates the first code or the second code of N digits using M characters, in the case where the virtual token generation function may use $M^N$ codes as the first code or the second code, the virtual token generation function may match each code for each count from the initial time point at which the detailed code generation function is operated. For example, when setting the unit count to one second, the detailed code generation function matches $M^N$ different codes every second from the first driven time point. Moreover, when the period of using the specific detailed code generation function or the usage period (e.g., the expiration date of a smart card generating the virtual token) of the virtual token generation device 100 is set to be shorter than the time length (e.g., $M^N$ seconds in the case where 1 count is 1 second) corresponding to $M^N$ count, the first code or the second code is not redundantly generated during the usage period. That is, when the count increases with time, in the case where a user requests the virtual token generation device 10 to generate a virtual token at a specific time point, the virtual token generation device 100 may generate a code value matched with a count corresponding to a specific time point, as the first code or the second code.

Moreover, according to another embodiment, at least one of the first code or the second code included in the virtual token may be generated by reflecting a value (i.e., device identification value) that is always differently present at the same time point in each of the virtual token generation means 10 such that the same virtual token is not generated at the same time point even within the same group (i.e., the same card type group of the same card issuer). That is, when the issuance of the virtual token is requested by the plurality of virtual token generation means 10, which is the same card type or card kind at a specific time point, the first code or the second code is differently generated by reflecting a value differently assigned to each of the virtual token generation means 10 at each time point such that each of the virtual token generation means 10 generates different virtual tokens.

For example, when the virtual token includes the fixed code corresponding to an issuer identification code, the virtual token verification device 200 (e.g., a card issuer server) assigns a virtual token generation function for each card type of each card issuer distinguished by an issuer identification number. Accordingly, because different virtual tokens are generated between different card issuers/card types by the fixed code, the virtual token generation means 10 needs to generate the detailed code such that the same virtual token is not generated within a specific card type group of the same card issuer. To this end, the detailed code is generated by reflecting the value differently assigned to each of the virtual token generation means 10 at each time point such that each of the virtual token generation means 10 generates different virtual tokens.

For example, the device identification value may be the elapsed time (or the number of counts) from the start time point (e.g., the time point at which a specific empty card is registered in the specific virtual token generation device 200 and the detailed code generation function starts to be applied, after a specific time elapses from the first time point at which the specific detailed code generation function is driven in the server 20), at which the specific virtual token generation means 10 is included in a group to which the specific detailed code generation function is applied, to the present. For example, the device identification value is used as the time elapsing from a count at which the actual card number belongs to the corresponding card type group after the actual card number is registered in the card type of a specific card issuer at the request of a specific user. For example, when the virtual token is generated from the combination of the first code and the second code, the virtual token generation function may generate the second code based on the unit count elapsing from a time point when the actual card number is registered (i.e., the actual card number is stored within a storage location search algorithm of the specific card type) in a virtual token service.

Even when the registration of the actual card number of the same card type is requested within the virtual token service by a plurality of virtual token generation means at the same time, the different codes needs to be generated to solve the problem of redundant code. When the counts for setting the virtual token generation means 10 to belong to the corresponding card type group are not the same as one another (e.g., when the actual card number for the virtual token generation means 10 is not capable of being registered in the corresponding card type group at the same time point), the time elapsing from a time point (or count), when the virtual token generation means 10 belongs to the group, to a specific time point may be different for each of the virtual token generation devices 100. For example, when the card registration within a virtual token service is simultaneously requested by several users with respect to the same card type of the specific card issuer, the virtual token verification means 20 may process the card registration request received at the same time as the request coming at a different count by assigning the order depending on the predetermined condition. That is, the virtual token verification means 20 may match the actually simultaneously received card registration request to a different count such that the difference of at least one unit count occurs and may allow the number of counts elapsing from a time point, when the actual card number for each of the virtual token generation means 10 is registered, to the specific same time point so as to be always different.

Accordingly, at least one of the detailed code generating functions may allow the virtual tokens generated by each of the virtual token generation devices 100 to be always different for each time point, using the time elapsing from the time point (or count), at which the virtual token generation devices 100 belong to the specific card type group, to a specific time point as a device identification value. As such, the virtual token verification means 20 may distinguish the virtual token generation means 10 only by receiving the virtual token without separately receiving the data for distinguishing the user.

Moreover, because the time length elapsing from the time point (e.g., a time point at which the actual card number is stored in a storage location search algorithm for a specific card type within a virtual token verification server), at which a specific virtual token generation device 100 belongs to a specific card type group, continuously increases with time, the detailed code (e.g., the second code) generated by the specific virtual token generation device 100 is not generated as the same value but is continuously generated as a different value.

Furthermore, according to still another embodiment, the first code may be set as a code value corresponding to a time point (or count) at which the generation of a virtual token is requested, among codes matched for each count from an initial time point at which the first function is driven, the second code may be set as a code value generated by reflecting a value (i.e., a device identification value) that always differently exists at the same time point for each of the virtual token generation devices 100, and the virtual token may be used as a code value obtained by combining the first code and the second code, such that a redundant virtual token is not generated in the whole period regardless of the user. Because the first code has a different code value for each count and the second code has a different code value for each of the virtual token generation devices 100 at the same time point, the virtual token obtained by combining the first code and the second code may be output as a different code value for all of the virtual token generation devices 100 at all-time points.

Moreover, according to another embodiment, the virtual token generation function includes a detailed code combining function corresponding to a rule for arranging a plurality of detailed codes. That is, the virtual token generation function may have a specific rule that lists or places the characters included in a plurality of detailed codes. Accordingly, in the case of the virtual token generation means 10 and the virtual token verification means 20 including the same virtual token generation function, the virtual token generation means 10 may arrange the characters included in a plurality of detailed codes, depending on the detailed code combining function and the virtual token verification means 20 may separate a respective detailed code from the virtual token, using the same detailed code combining function.

Furthermore, in another embodiment, one of a plurality of listing rules that lists M characters in ascending order may be applied to the virtual token generation function. That is, various listing rules that list the M characters in ascending order may be applied to the virtual token generation function; the virtual token generation function may be classified into different virtual token generation functions depending on the applied listing rules.

The virtual token verification means 20 receives the virtual token generated by the virtual token generation means 10 in various manners. That is, various virtual token providing methods of the above-described virtual token generation device 100 described above may be applied.

For example, when a card issuer server includes the virtual token verification means, in the step S200 for receiving the virtual token, the virtual token payment is selected in the payment terminal by the user in a store by the virtual token or the virtual token verification means 20 determines that a code is the virtual token, based on a type of code received from the payment terminal by a payment settlement service server or the information (e.g., the fixed code for the virtual token matched with issuer identification information) included in the code. Accordingly, the virtual token verification means receives the virtual token from the payment settlement service server. At this time, the payment settlement service server receives the virtual token from the payment program driven by the financial transaction terminal (e.g., a POS device) 30 or a computer.

In S400, the virtual token verification means 20 extracts a plurality of detailed codes included in the virtual token. When the virtual token verification means 20 includes the virtual token generation function including the virtual token generation means 10, the virtual token verification means 20 extracts a plurality of detailed codes by identically applying the rule (i.e., the detailed code combining function) for combining a plurality of detailed codes. That is, the detailed code combining function corresponds to the rule for arranging a plurality of detailed codes; the detailed code combining function is included in the virtual token generation function.

Moreover, according to another embodiment, when the virtual token includes the fixed code for determining the group for including the virtual token generation means 10, the step S400 for extracting the detailed code may extract the fixed code from the virtual token, may determine the card type group of the virtual token generation means based on the fixed code, and may determine the virtual token generation function or the storage location search algorithm for the card type group. That is, when differently applying the virtual token generation function or storage location search algorithm for each group, the virtual token verification means 20 distinguishes a group based on the fixed code in the virtual token.

Moreover, a procedure of determining the virtual token generation function using the fixed code may be performed before a procedure of extracting a plurality of detailed codes. When the virtual token generation function is determined by the fixed code, the detailed code combining function included in the virtual token generation function is determined to extract a plurality of detailed codes.

To this end, the fixed code may be combined at a fixed location (e.g., the specific number of digits in front of the virtual token) within the virtual token such that the virtual token verification means 20 is capable of being easily separated without a separate function.

In S1000, the virtual token verification means 20 searches for the storage location of the actual card number based on a plurality of detailed codes (a step for searching for the actual card number). The plurality of detailed codes have the correlation between each other; the virtual token verification means 20 searches for the storage location of the actual card number based on the correlation between the detailed codes.

According to an embodiment, the code generated for each unit count may be changed in a plurality of detailed codes within the virtual token (e.g., when the virtual token composed of two detailed codes, the first code and the second code is changed for each unit count), the virtual token verification means 20 may adjust the point matched with the storage location of the actual card number to the location matched with the first code and the second code, for each unit count so as to search for the storage location the actual card number even though the virtual token is changed for each unit count.

According to an embodiment associated with the correlation between the detailed codes constituting the virtual token, when the virtual token is made through the combination of the first code and the second code, the virtual token verification means 20 may set the first code to the search start point (i.e., the point for starting the search of the storage location of the actual card number) and may apply the second code to the path for moving from the search start point to the storage location to search for the storage location. That is, when the normally generated virtual token is received for each unit count, the virtual token verification means 20 determines that the search point moving along the search path corresponding to the second code from the start point corresponding to the first code is the point (e.g., storage space matched with the search point in a separate server) matched with the storage location of the actual card number or the storage location.

According to an embodiment, when the second code includes information about the path from the search start point corresponding to the first code to the storage location, the virtual token verification means 20 may search for the point matched with the storage location of the actual card number or the storage location along the search path corresponding to the second code from the search start point corresponding to the first code.

According to another embodiment, the virtual token verification means 20 may include a storage location search algorithm for adjusting the storage location of the actual card number so as to be matched with the virtual token for each unit count. That is, the virtual token verification means 20 includes the storage location search algorithm providing the search path to the point matched with the storage location of the actual card number for each unit count. The storage location search algorithm may move the storage location of the actual card number to the location corresponding to the first code and the second code of the specific count or may search for the fixed storage location of the actual card number by the first code and the second code of the specific count. The storage location search algorithm may be implemented in various forms.

Figure 9:
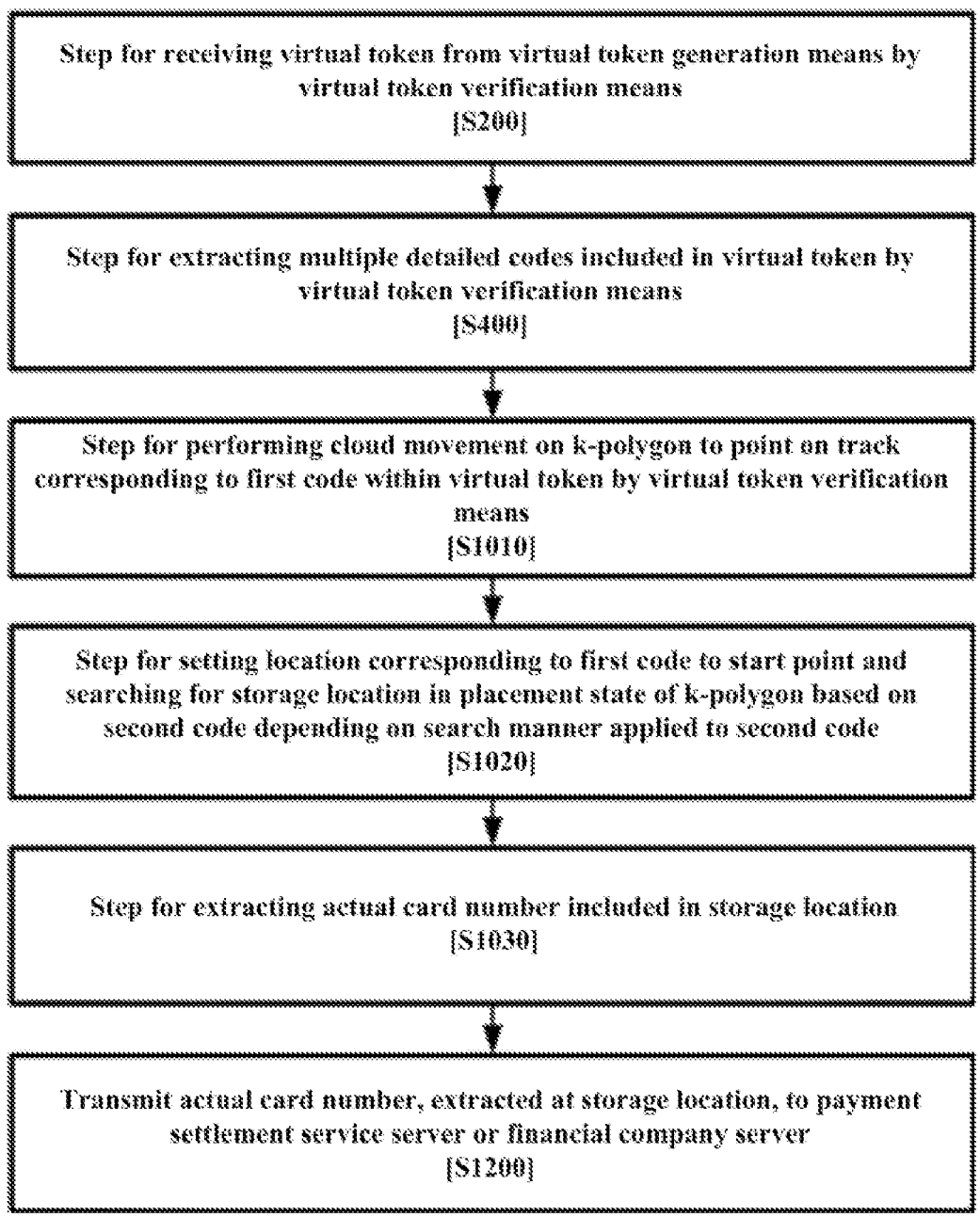
FIG. 9 is a flowchart of a virtual token-based payment providing method including a procedure of searching for an actual card number according to k-polygon cloud movement, according to an embodiment of the inventive concept.

According to an embodiment, as illustrated in FIG. 9, the storage location search algorithm is to perform cloud movement on the k-polygon while the vertex of the k-polygon corresponds to the point at which each code is positioned on a track on which 'k' ('k' is $M^N$) codes are listed. At this time, the step S1000 for searching for the actual card number includes a step S1010 for performing, by the virtual token verification means 20, cloud movement on the k-polygon to the point on the track corresponding to the first code within the virtual token received from the virtual token generation means 10, a step S1020 (a step for searching for a storage location) for setting the location corresponding to the first code to the start point and searching for the storage location in the placement state of the k-polygon or the point matched with the storage location based on the second code depending on the search method applied to the second code, and the step S1030 for extracting the actual card number included in the storage location.

As illustrated in FIG. 8, in S1010, the virtual token verification means 20 performs cloud movement on the k-polygon to the point on the track corresponding to the first code within the virtual token received from the virtual token generation means 10. The storage location search algorithm is the k-polygon ('k' is $M^N$) on which the cloud movement is performed along the track on which $M^N$ codes corresponding to the first code are listed; the vertex of the k-polygon moves while corresponding to the point at which a code is positioned on a first code track. At this time, the virtual token verification means 20 may apply the k-polygon to the cloud movement such that the vertex of the k-polygon is in contact with the point corresponding to the first code.

As illustrated in FIG. 8, in S1020, the virtual token verification means 20 sets the location corresponding to the first code to the start point and searches for the point (i.e., the specific vertex of a k-polygon) matched with the storage location or storage location in the placement state of the k-polygon, based on the second code in the search manner applied to the second code (a step for searching for the storage location). The storage location is matched with each vertex of the k-polygon. The point at which the first code track (i.e., a first track) corresponds to the k-polygon is the start point of the storage location search corresponding to the first code. The virtual token verification means 20 searches for the matching point of the storage location, at the search start point based on the second code.

Various methods may be applied to the method of searching for a storage location in the k-polygon based on the second code. In this way, the virtual token verification means 20 allows an angle to be changed from the location on the first track, which the k-polygon is contact with, to an angle (e.g., a specific angle obtained by dividing 180 degrees into $M^N$ pieces so as to face the vertex of the k-polygon) corresponding to a second code, the virtual token verification means 20 may search for the vertex of the k-polygon that is a storage location at which the actual card number corresponding to the virtual token is stored.

Furthermore, for another example, in a state where the k-polygon is in contact with the point corresponding to the first code on the first track, the virtual token verification means 20 divides the whole central angle (i.e., 360 degrees) into $M^N$ pieces based on the center of the k-polygon and the contact point on the first track, and matches each angle to $M^N$ second codes. At this time, the direction of the line moving by unit angles (i.e., 360 degrees/$M^N$) of specific numbers from the line connecting the center of the k-polygon to the contact point on the first track faces the specific vertex of the k-polygon. Accordingly, when the second code corresponding to the specific angle is received, the virtual token verification means 20 may search for the vertex positioned in the corresponding angle direction.

Furthermore, for another example, the specific digit of the second code may be used to determine an angle calculation direction. That is, when the second code is generated using 'N' ('N' is a natural number) characters, the angle measurement direction may be determined with one digit. For example, when the virtual token verification means 20 divides the whole central angle (i.e., 360 degrees) into $M^N$ pieces based on the center of the k-polygon and the contact point on the first track and matches the second code to each angle, the virtual token verification means 20 may determine whether the angle is an angle measured to the right from the line connecting the center of the k-polygon to the contact point on the first track or whether the angle is an angle measured to the left.

For example, the storage location search algorithm may assign two second codes different from each other depending on the angle measurement direction at each vertex on the k-polygon, to one vertex. That is, the second codes different from each other in the arrival with the interior angle and the arrival with the exterior angle may be matched with the one vertex and may be connected to the actual card number. For another example, when the second code is generated using 'N' ('N' is a natural number) characters, the storage location search algorithm may match (N−1) characters with half of the total angle (e.g., 360 degrees in the case where the total angle is divided based on the center angle) and may determine the angle application direction for reaching each vertex, using one digit.

The method of searching for a storage location in the k-polygon based on the second code is not limited thereto; various methods such as the method of searching for a point for dividing space between the point on the k-polygon corresponding to the second code and the contact point on the first track at a specific ratio, as the storage location may be applied.

Afterward, in S1030, the virtual token verification means 20 extracts the actual card number included in the storage location. That is, the virtual token verification means 20 searches for the storage location corresponding to the vertex of the k-polygon and then extracts the actual card number in the storage location.

Moreover, according to another embodiment, the storage location search algorithm is moving to the point matched with the storage location of the actual card number on the track based on a plurality of detailed codes constituting the virtual token. For example, the point matched with the storage location of the actual card number may be a point on the track corresponding to the count (i.e., a time point) at which the actual card number is registered in the virtual token generation means.

Figure 10:
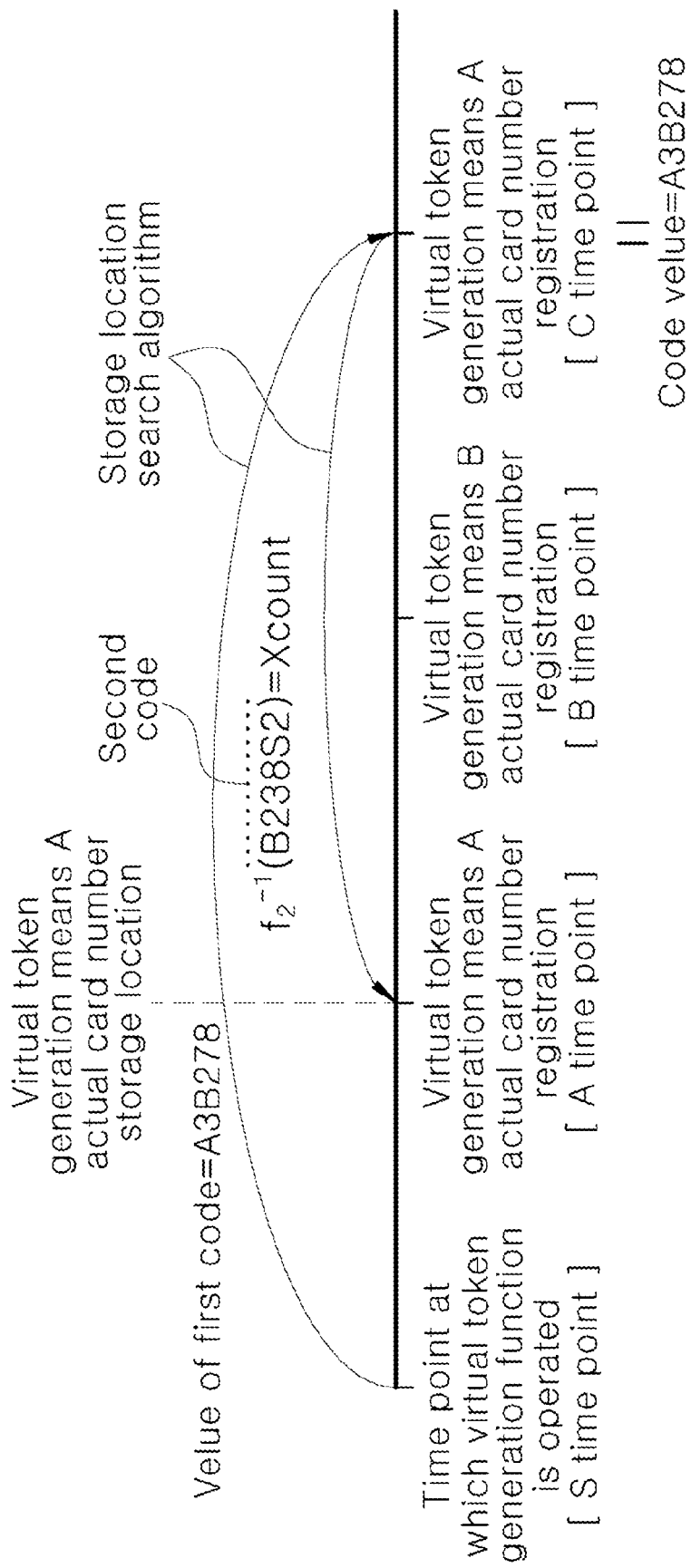
FIG. 10 is an exemplary view illustrating a storage location search algorithm searching for a storage location by moving on a track based on a detailed code, according to an embodiment of the inventive concept.

In particular, when the virtual token includes the first code generated based on the time elapsing from a time point when a virtual token generation function is operated and the second code generated based on the time elapsing from a time point when the actual card number is registered in a specific virtual token generation means, as illustrated in FIG. 10, the virtual token verification means 20 may set the count on the track matched with the code value corresponding to the first code to a search start point and may search for the point (i.e., the point matched with the storage location of the actual card number) on the track at the time point when the actual card number is registered in the virtual token generation means 10 by returning along a track from the search start point by the count value calculated when the inverse function of the second function is applied to the second code.

Figure 11:
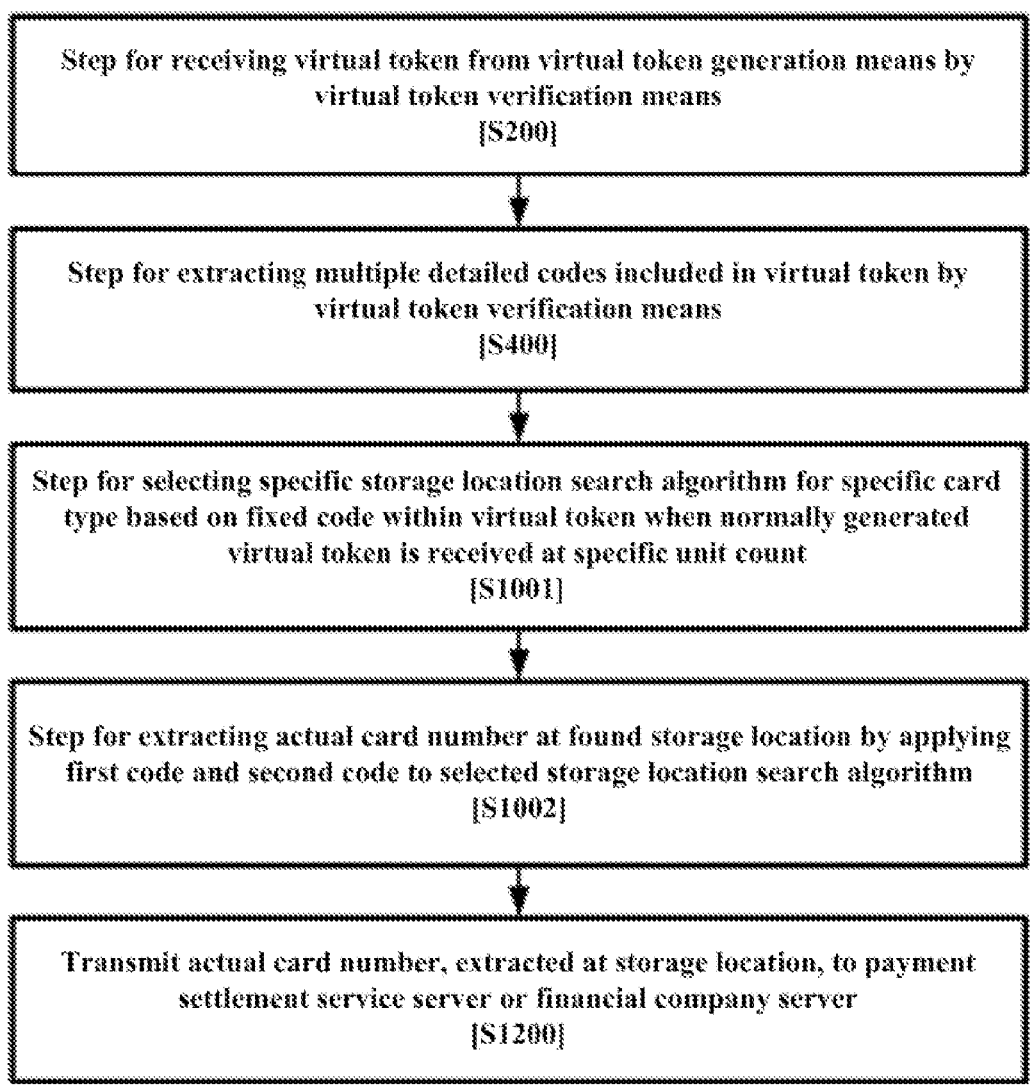
FIG. 11 is a flowchart of a virtual token-based payment providing method further including a procedure of searching for a storage location search algorithm corresponding to a virtual token, according to an embodiment of the inventive concept.

Moreover, according to another embodiment, as illustrated in FIG. 11, the step S1000 for searching for the actual card number includes the step S1001 for selecting a specific storage location search algorithm for a specific card type based on the fixed code within the virtual token and the step S1002 for extracting the actual card number at the found storage location by applying the first code and the second code to the selected storage location search algorithm, when the normally generated virtual token is received at a specific unit count. Because the virtual token verification means 20 may provide the virtual token service after a plurality of card types of a plurality of card issuers are registered, the virtual token verification means 20 may apply the storage location search algorithm different for each card type. At this time, in S1001, the virtual token verification means 20 selects the storage location search algorithm of the card type to which the virtual token belongs, based on the fixed code corresponding to the issuer identification code. Afterward, in S1002, the virtual token verification means 20 extracts the first code and the second code, using the virtual token generation function (i.e., the detailed code combining function) corresponding to the storage location search algorithm and searches for the actual card number corresponding to the virtual token, using the first code and the second code.

In S1200, the virtual token verification means 20 transmits the actual card number extracted from the storage location to a payment settlement service server or a financial company server. When providing the actual card number to the PG server, the payment settlement service server may transmit the actual card number received by the virtual token verification server to the financial company server to make a payment. When the virtual token verification server directly provides the actual card number to the financial company server, the virtual token verification server may receive the payment request information other than the virtual token from the payment settlement service server together with the virtual token and may transmit the actual card number found based on the virtual token and the payment request information to the financial company server together.

Figure 12:
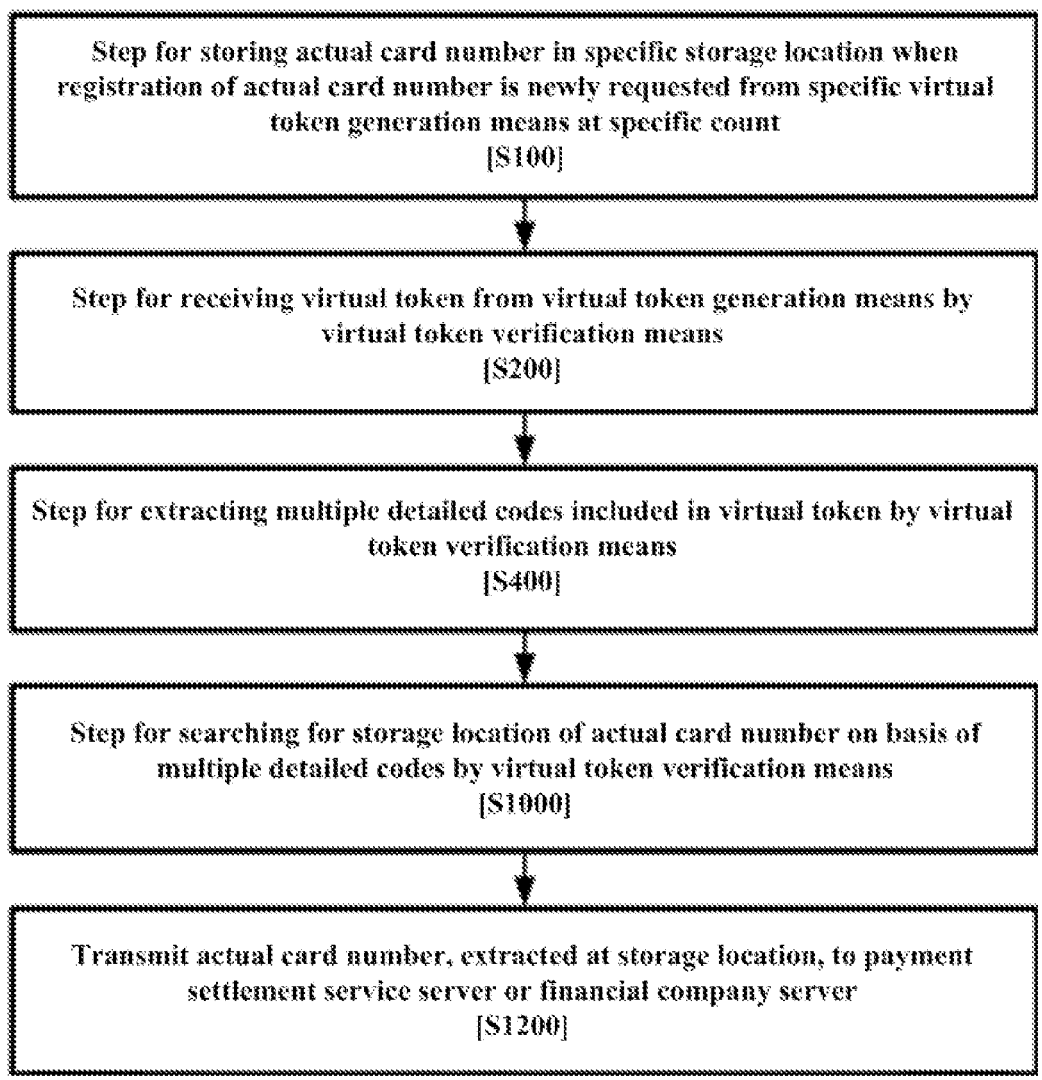
FIG. 12 is a flowchart of a virtual token-based payment providing method further including a procedure of storing an actual card number in a specific storage location as an actual card number registration request within a virtual token service is received, according to an embodiment of the inventive concept.

Moreover, as illustrated in FIG. 12, according to another embodiment, when the specific virtual token generation means 10 requests the virtual token service to newly register the actual card number at a specific count, a step S100 for storing/registering the actual card number in the storage location corresponding to the specific count (a step for registering the actual card number) may be further included.

In the case where a user registers the respective card when the user subscribes a service or after the user subscribes the service, the virtual token verification means 20 may perform a step for registering the actual card number.

For example, when the storage location search algorithm uses the k-polygon, the virtual token verification means 20 newly registers the actual card number in the specific vertex of the k-polygon corresponding to the specific count. The specific vertex contacts the specific count on the track. When a specific time point (or count) elapses after the virtual token verification means 20 drives the virtual token generation function and the storage location search algorithm, the virtual token verification means 20 may store the newly generated actual card number in the storage location matched with the vertex of the k-polygon contacting the first track as the registration of a new actual card number for the specific virtual token generation means 10 is received. In particular, the cloud movement is performed on the k-polygon such that the location at which the k-polygon contacts the track is moved for each code for each count as the virtual token generation function and the storage location search algorithm are operated in the virtual token verification means 20; when the registration of the new actual card number is requested at a specific count, the vertex contacting the track at a specific count is determined as the point on the k-polygon at which the actual card number is stored.

For example, as illustrated in FIG. 8, the virtual token verification means registers the actual card number at 'A' time point with respect to the virtual token generation means A, and then stores the actual card number of the virtual token generation means A in the vertex of the k-polygon contacting the track at 'A' time point. Afterward, as the count elapses, the cloud movement is performed on the k-polygon along the track. The storage location at which the actual card number of the virtual token generation means A is stored may be rotation by the rotation of the k-polygon.

That is, after the actual card number is stored in the vertex of the k-polygon contacting the track, the point at which the actual card number is stored by 'n' counts is rotated by rotating the k-polygon by 'n' counts. Accordingly, when the second code is calculated by reflecting the number of unit counts elapsing from a count (i.e., time point) at which the actual card number is registered, the virtual token verification means 20 may calculate the point on the k-polygon at which the actual card number is stored at a time point when the virtual token is generated, through the second code.

In particular, when the first code is a code value corresponding to the number of counts elapsing from the first time point at which the specific virtual token generation function and the storage location search algorithm are operated within the virtual token verification means 20 and when the second code is a code value corresponding to the number of counts elapsing after the actual card number is registered with respect to the specific virtual token generation means 10, the virtual token verification means 20 may grasp the time point (e.g., 'C' time point), at which the virtual token generation means 10 makes a request for the virtual token generation, through the first code and may grasp the vertex of the k-polygon at which the actual card number is stored, in the k-polygon placement state of the corresponding time point through the second code. That is, the first code is used to determine the point on the track that results in the k-polygon placement state capable of searching for the specific vertex of the k-polygon; the second code is used to search for the vertex on the k-polygon matched with the storage location of the actual card number after the k-polygon is positioned at the point on the track corresponding to the first code. In this way, even though there is a delay time to provide the virtual token to the virtual token verification means 20 after the virtual token generation means 10 generates the virtual token, the virtual token verification means 20 may accurately search for the actual card number corresponding to the virtual token.

Moreover, according to another embodiment, as illustrated in FIG. 10, when using the storage location search algorithm that moves on a single track based on the first code and the second code, the virtual token verification means 20 may determine that the point (i.e., a time point ('A' time point) at which the actual card number is registered) on the track on which the pointer that starts at a track start point from the time point, at which the virtual token generation function is operated, is positioned by moving the divided unit on the track whenever a unit count elapses is the point matched with the storage location of the actual card number.

In particular, in the case where the user registers several different types of cards in the virtual token service, when the user enters the actual card number to register a first card in the virtual token service, the virtual token verification means 20 may grasp the card issuer and the card type based on the issuer identification number included in the actual card number of the first card and may select the first storage location search algorithm corresponding to the actual card number. Afterward, the virtual token verification means 20 may set the count at the time point at which the registration of the actual card number is requested, to an actual card number registration time point ('A' time point) and may match the actual card number at 'A' time point of the selected first storage location search algorithm. At this time, the virtual token verification means 20 provides the virtual token generation means 10 of the user with the first virtual token generation function for the first card. The first virtual token generation function may include the fixed code corresponding to the issuer identification number of the first card, the detailed code generation function, and the detailed code combining function.

Afterward, when the user registers the second card of the card issuer or the card type different from the first card in the virtual token service to utilize the second card, the virtual token verification means 20 may grasp the card issuer and card type based on the issuer identification number included in the actual card number of the second card and may select the second storage location search algorithm corresponding to the actual card number. Afterward, the virtual token verification means 20 may set the count at the time point at which the registration of the actual card number is requested, to an actual card number registration time point (A' time point) and may match the actual card number at A' time point of the second storage location search algorithm. At this time, the virtual token verification means 20 provides the virtual token generation means 10 of the user with the second virtual token generation function for the second card.

Afterward, when the user makes a payment with the first card or the second card through the virtual token service, the virtual token generation means 10 generates the virtual token through the virtual token generation function (e.g., the first virtual token generation function) corresponding to the card (e.g., the first card) selected from the user and then provides the virtual token to the virtual token verification means 20. The virtual token verification means 20 may search for the storage location search algorithm corresponding to the virtual token based on the fixed code included in the virtual token and searches for the actual card number based on the detailed code extracted from the virtual token.

Figure 13:
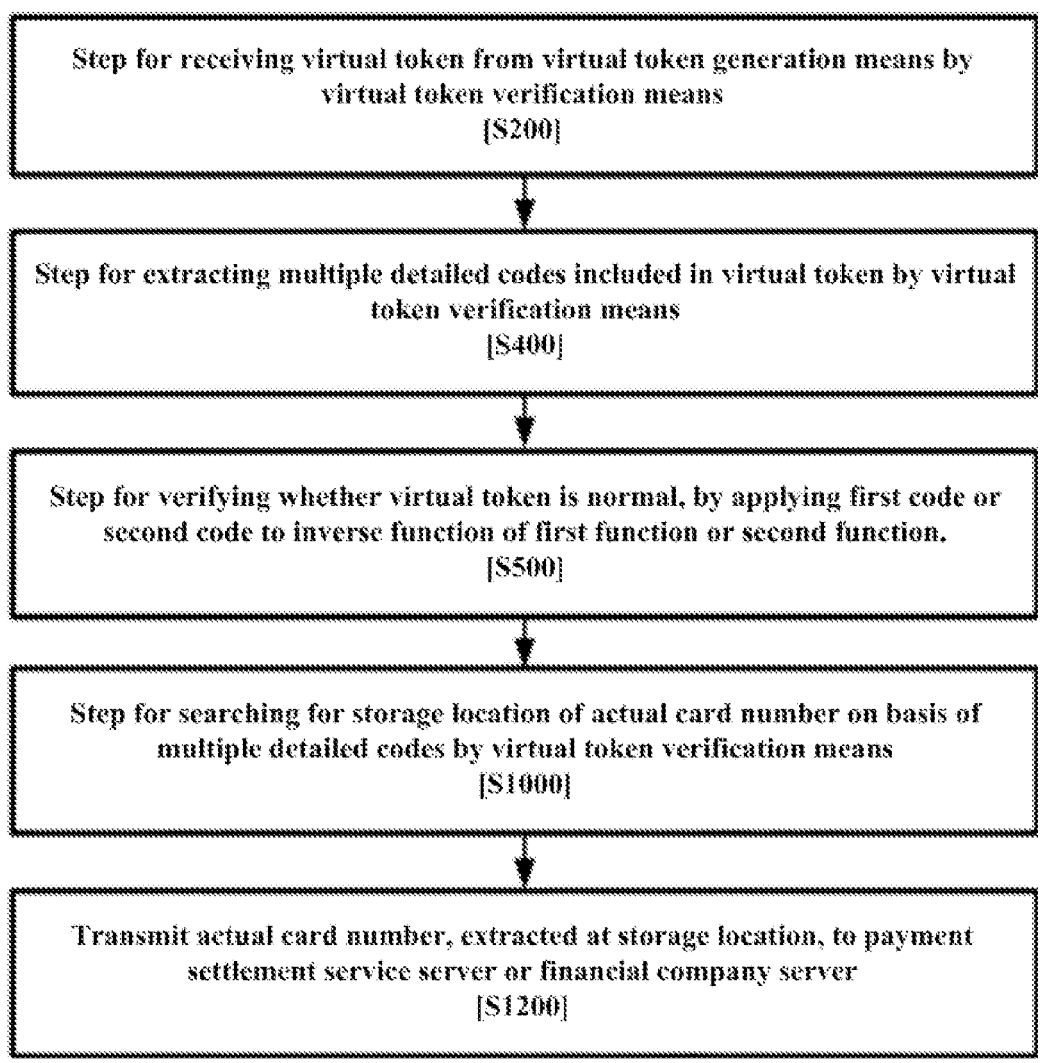
FIGS. 13 and 14 are flowcharts of a virtual token-based payment providing method including a step for verifying a virtual token, according to an embodiment of the inventive concept.

Moreover, according to another embodiment, as illustrated in FIG. 13, the virtual token verification means 20 further includes a step S500 of verifying whether the actual card number corresponds to the normally generated virtual token, by applying the first code or the second code to the inverse function of the first function or the second function. For example, in the case where the first code is the code value corresponding to the number of counts elapsing from the first time point when the specific virtual token generation function and the storage location search algorithm within the virtual token verification means 20 are operated, and in the case where the second code is a code value corresponding to the number of counts elapsing after the actual card number is registered with respect to the specific virtual token generation means 10, the virtual token verification means 20 together stores time $T_s$ elapsing until the actual card number is registered after the virtual token generation function is operated, when the actual card number in the storage location is stored. The virtual token verification means 20 may calculate the elapsed time $T_1$ from a point in time, when the virtual token generation function is operated, to the virtual token generation time point by applying the inverse function of the first function to the first code within the virtual token and may calculate the elapsed time $T_2$ from a point in time, when the actual card number is registered, to the virtual token generation time point by applying the inverse function of the second function to the second code within the virtual token. Afterward, the virtual token verification means 20 may verify the virtual token by determining the difference between $T_1$ and $T_2$ corresponds to $T_s$.

Figure 14:
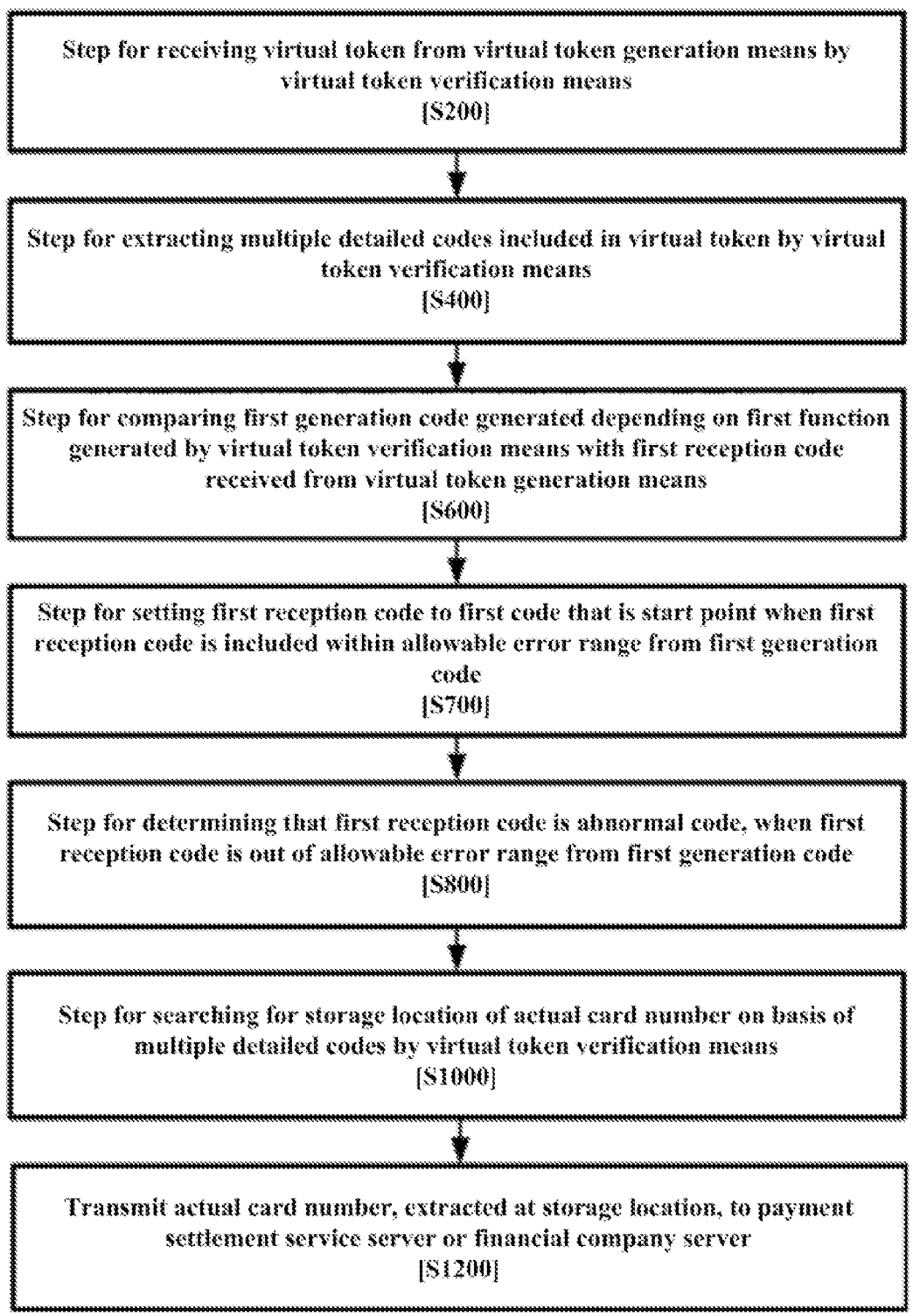

Moreover, according to another embodiment, as illustrated in FIG. 14, a step S600 for comparing the first generation code generated depending on the first function generated by the virtual token verification means 20 with the first reception code received from the virtual token generation means 10, a step S700 for setting the first reception code to the first code that is the start point when the first reception code is included within an allowable error range from the first generation code, and a step S800 for determining that the first reception code is an abnormal code, when the first reception code is out of the allowable error range from the first generation code may be further included. In the virtual token generation means 10 and the virtual token verification means 20, the same unit count elapses with time. However, there is an error between timers included in the virtual token generation means 10 and the virtual token verification means 20; the number of counts elapsing at the same time point may be different. Accordingly, it is necessary to determine the abnormal code that is not the normal virtual token, while removing the error caused by the timer. To this end, the virtual token verification means 20 may compare the first generation code, which is the first code internally generated at the specific count by the first function, with the first reception code, which is the first code within the virtual token received from the virtual token generation means 10, in S600, may perform a procedure of searching for the card number based on the first reception code after determining the normal code when the difference in count between the first generation code and the first reception code is within the allowable error range in S700, and may determine the abnormal code when the difference in count between the first generation code and the first reception code is out of the allowable error range in S800.

Moreover, according to another embodiment, when the virtual token further includes the virtual security code of the specific number of digits, a step for verifying the virtual token by determining, by the virtual token verification means, whether the reception virtual security code received from the virtual token generation means is the same as the generation virtual security code generated within the virtual token verification means is further included. The virtual security code may be generated to correspond to the number of digits of the card security code, and the digit of the card security code of the actual card number may be displayed.

According to an embodiment, the virtual security code may be generated based on the unique value and the card security code (e.g., CVC/CVV number) within the virtual token generation device. The unique value is a device unique value individually assigned for each virtual token generation device. The unique value and the card security code may be assigned to each of the virtual token generation devices 100; for the purpose of hacking a virtual token generation device for malicious purposes, a person that newly subscribes to a virtual token service in the virtual token generation device and receives a virtual token generation function may not identify the unique value and the card security code assigned to a respective virtual token generation device. Accordingly, the virtual token verification means 20 may verify the virtual token generation means 10 by receiving the virtual security code generated based on unique value and card security code by the virtual token generation means 10.

Moreover, according to another embodiment, the virtual token generation means 10 may generate the virtual security code by reflecting the time value. That is, the virtual token generation means 10 may generate the virtual security code, using the OTP (user authentication using a randomly generated OTP instead of a fixed password) method. The virtual token verification means 20 receives the OTP number corresponding to the virtual security code from the virtual token generation means 10 and verifies the virtual token generation means 10 by comparing the OTP number, which is generated at the count within the specific range from the received count, with the OTP number from the virtual token generation means 10. That is, the virtual token verification means 20 may store the card security code (e.g., CVC/CVV) and the unique value within the storage location of the actual card number together and may verify the virtual token generation means 10 by determine whether the OTP number generated using the card security code and the unique value extracted from the storage space of the actual card number at a time point when the virtual token is received is the same as the OTP number received from the virtual token generation means 10.

Figure 15:
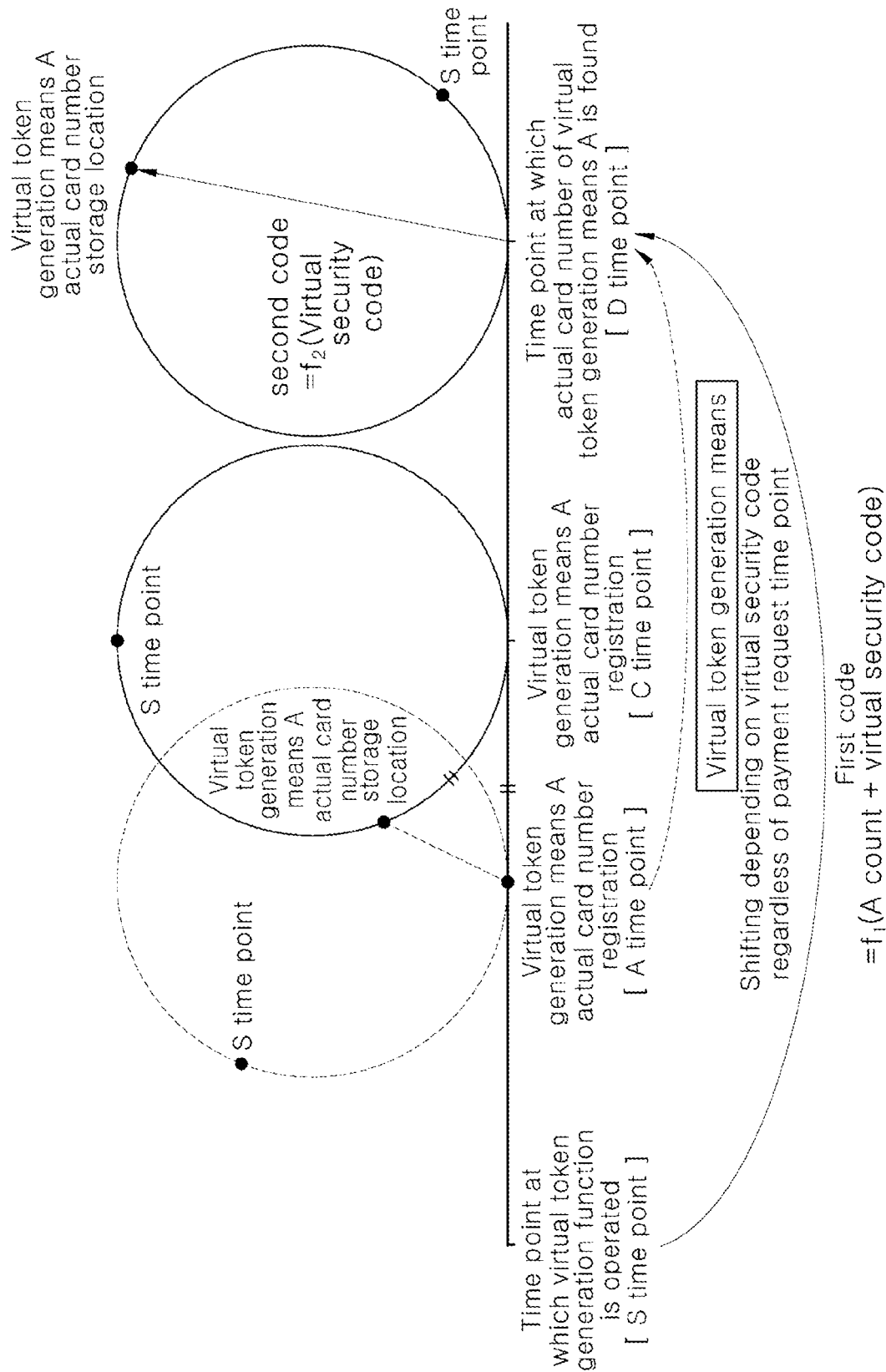
FIG. 15 is an exemplary view of a method of moving a time point of actual card number search using a virtual security code, according to an embodiment of the inventive concept.

Moreover, according to another embodiment, the virtual security code may be reflected by generating the first code and the second code without outputting the virtual token generation means to the outside. As illustrated in FIG. 15, the virtual token generation means 10 generates the first code of the count, to which the virtual security code value generated based on the unique value and the card security code within the virtual token generation device is added at a time point when the actual card number is registered, and generates the second code of the count corresponding to the virtual security code value. That is, the first code and the second code is generated based on the count shifted by the value of the virtual security code from a time point 'A' at which the actual card number is registered in the virtual token generation device A. The count shifted from the time point 'A' may be a count earlier or later than the count corresponding to the present time point depending on the generated virtual security code value. The virtual token verification means 20 may search for the point with matched which the storage location of the actual card number, by applying the received first code and the received second code to the storage location search algorithm. As such, it is impossible for other people to identify the order in which the first code and the second code constituting the virtual token, thereby improving the security.

Furthermore, in another embodiment, after extracting the virtual security code from the second code generated based on the virtual security code, the virtual token verification means 20 (i.e., OTP function) may determine whether there is a value the same as the virtual security code among the calculated OTP numbers, by entering the count within a specific range from the count, at which the virtual token is received, into the virtual security code generation function (i.e., OTP function). The virtual token verification means obtains the virtual security code value (i.e., an OTP function value) used to generate the second code by applying the inverse function of the second function to the second code and searches for the count at which a value the same as the virtual security code value is calculated. As the difference between a time point at which the virtual security code is generated by the virtual token generation means and a time point at which the virtual token verification means receives the virtual security code is present due to the transmission time of the virtual token or delay, the count at which the virtual token verification means 20 receives the virtual token may not be the same as a count at which the OTP number corresponding to the virtual security code is generated, and thus the virtual token verification means 20 allows an error range from the count at which the virtual token is received. In this way, the virtual token verification means 20 may verify whether the virtual token generation means transmitting the virtual token is normally matched with the actual card number, thereby improving the security. Moreover, because the virtual token verification means 20 searches for the virtual security code to verify the virtual token generation means 10 even though the user does not enter the virtual security code of specific digits upon entering the virtual token, the user may easily utilize the virtual token generation means 10.

Moreover, according to another embodiment, the virtual token generation means 10 may generate the first code corresponding to the count obtained by adding the virtual security code value generated based on the unique value and the card security code within the virtual token generation device at a time point at which the financial transaction is requested and may generate the second code corresponding to the count obtained by adding the value of the virtual security code and the count difference between the actual card number registration time point ('A' time point) and the payment request time point ('C' time point). That is, the equation in which the virtual token generation means 10 generates the first and second codes is as follows.

The first code=$f_1$(count at time point 'C'+virtual security code)

The second code=$f_2$(count at time point 'C'−count at time point 'A'+virtual security code)

($f_1$: first function, $f_2$: second function, 'A' time point: actual card number registration time point, 'C' time point: the count of a payment request time point, and virtual security code: OTP number)

The virtual token verification means 20 searches for the storage location of the actual card number based on the first code and the second code within the received virtual token and extracts the card security code (i.e., CVV or CVC) included in the storage location of the actual card number and the unique value of the virtual token generation device 100. The virtual token verification means 20 generates a virtual security code (i.e., an OTP number) based on the card security code and the unique value within a specific count range from a time point at which a financial transaction request is received. Afterward, the virtual token verification means 20 may determine whether there is a count at which the number of counts (i.e., a value obtained by applying the inverse function of the second function to the second code) corresponding to the second code is the same as the sum of the number of counts to each count within a specific count range from a time point when the financial transaction request is received from the actual card number registration time point ('A' time point) and the virtual security code (i.e., OTP number). As the virtual token verification means searches for the point to which the storage space of the actual card number is matched, based on the first code and the second code, the virtual token verification means grasps the registration time point of the actual card number. In this way, the virtual token verification means 20 may determine whether the virtual token generation means 10 providing the virtual token is normally issued (i.e., whether the virtual token service is subscribed by the normal user).

Figure 16:
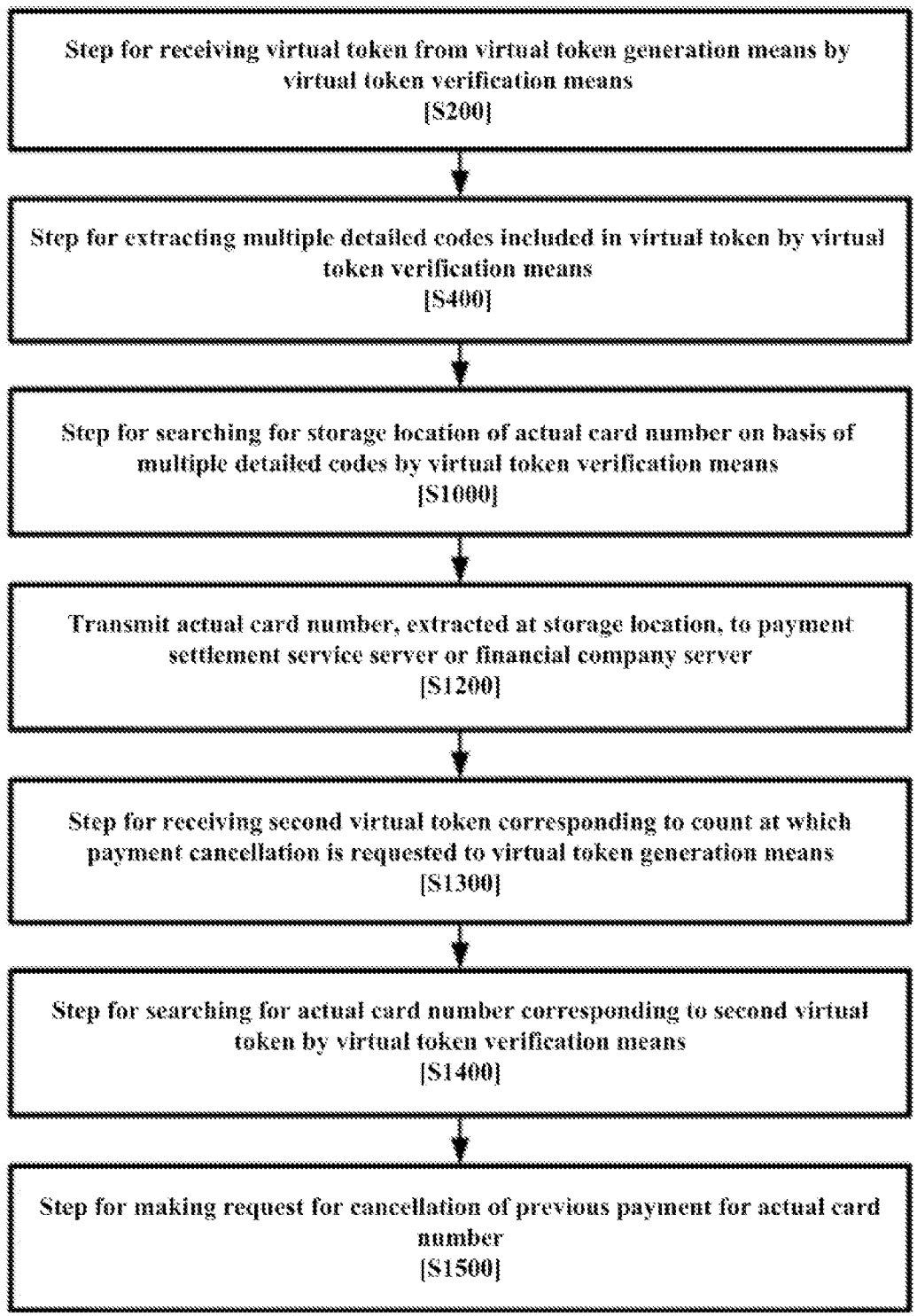
FIG. 16 is a flowchart of a virtual token-based payment providing method further including a procedure of canceling a payment, according to an embodiment of the inventive concept.

Moreover, according to another embodiment, as illustrated in FIG. 16, when a financial transaction cancellation request is received from the specific virtual token generation means, a step S1300 for receiving a virtual token corresponding to the count at which the financial transaction cancellation is requested to the virtual token generation means, a step S1400 for searching, by the virtual token verification means, for an actual card number corresponding to the virtual token, and a step S1500 for making, by the financial company server, a request for cancellation of the previous payment for the actual card number may be further included. In general, when the virtual token is used in financial transactions, it is difficult to again search for the virtual token for making the payment, and thus it is difficult to cancel the card payment. In an embodiment of the inventive concept, different virtual tokens may be issued at the time of a card payment and at the cancellation of a card payment. However, because the different virtual tokens are generated from the same virtual token generation means, the different virtual tokens are connected to the same actual card number. Accordingly, it is possible to easily search for the actual card number for making a payment, using the virtual token provided upon canceling a payment.

That is, in S1300, the virtual token verification means 20 receives the virtual token (i.e., the second virtual token) generated by the virtual card generation means 10 at a payment cancellation time point. In S1400, the virtual token verification means 20 searches for the actual card number corresponding to the second virtual token. The method of searching for the actual card number may be applied to the same method as the step S1000 of searching for the actual card number to proceed with financial transactions. Afterward, in S1500, the virtual token verification means 20 makes a request for the cancellation of the previous payment to a financial company server based on the actual card number found based on the second virtual token. Even though the virtual token verification means 20 does not search for the virtual token (i.e., the first virtual token), which has been used upon executing a financial transaction (i.e., card payment), the virtual token verification means 20 may proceed to cancel the financial transaction because the virtual token verification means 20 searches for the actual card number through which the financial transaction is executed, by using the second virtual token.

Moreover, according to another embodiment, a step S200 for receiving the virtual token includes receiving, by the virtual token verification means 20, the virtual token from the payment terminal when the virtual token generation means 10 accesses the payment page in a store and then inputs the virtual token. The payment page in the store is a page, which is provided when the intranet network (i.e., internal communication network) in the store is accessed, and includes a first interface for entering the virtual token and a second interface for entering order information.

In particular, the user accesses the store's intranet (i.e., internal communication network) via wireless communication with a mobile terminal including the virtual token generation means 10. For example, when the user visits a specific store, the virtual token generation means 10 may automatically search for the intranet and may provide a payment page in the store. Moreover, for example, in places where a plurality of stores are gathered (e.g., a foot court or food truck zones), the virtual token generation means 10 may provide the intranet network of the plurality of stores and the user may select the intranet network of the stores for placing an order or making a payment. Afterward, the virtual token generation means 10 receives the payment page via the intranet of the specific store and outputs the payment page on a screen.

Afterward, the user enters the virtual token into the first interface in the payment page and enters order information into the second interface. For example, the user may copy the virtual token generated in real time by virtual token generation device by executing the virtual token generation program, may move to the payment page, and may paste the virtual token into the first interface. Because the virtual token may not be reused after being generated at a specific time point, there is no problem with the leak even though the virtual token is copied and transmitted.

Afterward, the virtual token generation means 10 transmits the order information and the virtual token, which are entered onto the payment page, to the store terminal via the intranet. The store terminal transmits the virtual token and payment amount information to the payment settlement service server via the Internet; when it is determined that a virtual token is normal, the payment settlement service server transmits the virtual token and the payment amount information to the virtual token verification server. Afterward, the virtual token verification server searches for the actual card number based on the virtual token, transmits the actual card number to the financial company server, directly or through a payment settlement service server, and makes a request for payment approval.

In this way, a user employing the virtual token service places an order via wireless communication without lining up to place an order at the store. Because the user employs the virtual token changed for each unit count without using the actual card number, there may be no risk of card number leakage. Moreover, in a state (e.g., in a state where LTE communication is blocked due to the connection to intranet and Wi-Fi connection to Internet network is unavailable) where wireless communication with the outside is impossible as the mobile terminal is connected to the communication network in a store, the virtual token generation means 10 may generate the virtual token corresponding to a payment request time point, using a virtual token generation function stored therein to make a payment.

According to another embodiment of the inventive concept, a virtual token-based payment providing method includes a step for receiving a virtual token generation function (a step for receiving a virtual token generation function) as a virtual token generation means registers an actual card number in a virtual token verification means, a step for generating, by a virtual token generation means, a plurality of detailed codes matched with the payment request time point without performing the communication with the virtual token verification means at the payment request time point of a user, a step for generating, by a virtual token generation means, the virtual token by combining the first code and the second code, and a step for outputting, by a virtual token generation means, the virtual token to the outside to provide a virtual token verification server with the virtual token. The detailed description of the aforementioned contents will be omitted.

The virtual token generation function corresponds to a storage location search algorithm where the actual card number is stored in the virtual token verification means. The storage location search algorithm moves the storage location of the actual card number to a point indicated by a plurality of detailed codes for each unit count or searches for the fixed storage location of the actual card number based on the a plurality of detailed codes at a specific count. The plurality of detailed codes include the first code and the second code, which are used to search for the storage location of the actual card number in the virtual token verification means. The first code and the second code is changed and generated for each unit count by the detailed code generation function in the virtual token generation function.

Moreover, according to another embodiment, the virtual token further includes the fixed code; the fixed code is combined at a predetermined location within the virtual token and includes the code for determining the card issuer or the card type corresponding to the actual card number or a code for identifying the virtual token.

The virtual token-based payment providing method according to an embodiment of the inventive concept may be implemented by a program (or an application) and may be stored in a medium such that the program is executed in combination with a computer being hardware.

For the computer to read the program and to execute the method implemented by the program, the program may include a code that is coded in a computer language, which a processor (e.g., a central processing unit CPU) of the computer may read through a device interface of the computer, such as C, C++, JAVA, or a machine language. The code may include a functional code related to a function that defines necessary functions that execute the method, and the functions may include an execution procedure related control code necessary for the processor of the computer to execute the functions in its procedures. Further, the code may further include additional information that is necessary for the processor of the computer to execute the functions or a memory reference related code on which location (address) of an internal or external memory of the computer should be referenced by the media. Moreover, when the processor of the computer needs to communicate with any other remote computer or any other remote server to perform the functions, the code may further include a communication-related code associated with how to communicate with any other remote computer or server using the communication module of the computer, what information or media should be transmitted or received during communication, or the like.

The stored media may mean the media that does not store data for a short period of time such as a register, a cache, a memory, or the like but semi-permanently stores to be read by the device. Specifically, for example, the stored media include, but are not limited to, ROM, RAM, CD-ROM, magnetic tape, floppy disk, optical data storage device, and the like. That is, the program may be stored in various recording media on various servers that the computer can access, or various recording media on the computer of the user. In addition, the media may be distributed to a computer system connected to a network, and a computer-readable code may be stored in a distribution manner The inventive concept has the following various effects.

First, a virtual token is newly generated for each unit count and a redundant virtual token does not appear within the whole predetermined period, and thus the actual card number is not leaked even when the virtual token is leaked.

Second, only the virtual token generation device and the virtual token verification device include functions for generating a virtual token and an algorithm for searching for the actual card number is added only to the virtual token verification device, and thus the conventional process using the actual card number may be maintained as it is. For example, the POS device and the payment settlement service server may deliver the virtual token to the virtual token operator server while being maintained as it is; the card issuer server may make a payment by receiving the actual card number corresponding to the virtual token from the virtual token operator server, directly or via a PG server. As such, a portion to be changed in the conventional process may be minimized to increase security and the user does not need to perform an additional step to improve security.

Third, the virtual token provided from the same virtual token generation means may be matched with the actual card number regardless of the generation time point, and thus the financial transaction may be easily canceled even though the virtual token changed for each count is used.

Fourth, in the case where wireless communication is used only when the actual card number is registered in the virtual token service via the virtual token generation device, the virtual token corresponding to the count for making a payment may be output without using the wireless communication. In this way, the payment using a virtual token may be used regardless of whether the wireless communication is possible.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A virtual token-based payment providing method, the method comprising:
receiving, by a virtual token verification means, a virtual token provided by a virtual token generation means from a payment terminal, wherein the virtual token is matched with an actual card number by the virtual token generation means and then is generated;
extracting, by the virtual token verification means, a plurality of detailed codes included in the virtual token;
searching, by the virtual token verification means, for the actual card number based on the plurality of detailed codes; and
transmitting the found actual card number to a payment settlement service server or a financial company server,
wherein each of the virtual token verification means and the virtual token generation means includes the same virtual token generation function,
wherein the virtual token generation means receives the virtual token generation function to store the virtual token generation function in the virtual token generation means upon registering the actual card number to use a virtual token service and generates and outputs the virtual token matched with a payment request time point without communication with the virtual token verification means at a payment request time point of a user,
wherein the plurality of detailed codes include a first code and a second code, which are used to search for a storage location of the actual card number in the virtual token verification means,
wherein the first code and the second code are changed and generated by a detailed code generation function in the virtual token generation function for each unit count, and
wherein the unit count is set to a specific time interval and is changed as the time interval elapses.

2. The method of claim 1, wherein the virtual token further includes a fixed code,
wherein the fixed code is combined at a predetermined location in the virtual token, and includes a code for determining a card issuer or a card type corresponding to the actual card number or a code for identifying whether to correspond to the virtual token.

3. The method of claim 2, wherein the virtual token verification means includes a storage location search algorithm for an individual card type,
wherein the searching for the actual card number includes:
when the virtual token normally generated at a specific unit count is received, selecting a specific storage location search algorithm for a specific card type based on the fixed code in the virtual token; and
extracting the actual card number at the storage location found by applying the first code and the second code to the selected storage location search algorithm, and wherein the storage location search algorithm moves the storage location of the actual card number to a location corresponding to the first code and the second code of a specific count or searches for a fixed storage location of the actual card number by the first code and the second code of the specific count.

4. The method of claim 3, wherein the first code is to set a start point of storage location search, and
wherein the second code is to set a search path from the start point to the storage location depending on a specific search method.

5. The method of claim 4, wherein the first code and the second code are generated based on a count obtained by adding a virtual security code at an actual card number registration time point or a payment request time point, and
wherein the virtual security code is a code value a specific number of digits generated through an OTP function based on a unique value of the virtual token generation means and a card security code, and is not separately provided from the virtual token generation means to the virtual token verification means.

6. The method of claim 5, further comprising:
verifying, by the virtual token verification means, whether the virtual token generation means normally issue the virtual token, using a generation virtual security number calculated based on a time value within a specific range from a time point when the second code and the virtual token are received.

7. The method of claim 4, wherein the storage location search algorithm moves a pointer on a single track based on the first code and the second code, and
wherein the searching for the actual card number includes:
moving the pointer to a point on a track corresponding to the first code within the virtual token received from the virtual token generation means;
setting a location corresponding to the first code to a search start point and returning the track by a number of counts corresponding to the second code to search for a point matched with the storage location of the actual card number; and
extracting the actual card number included in the storage location of the actual card number.

8. The method of claim 1, wherein the receiving of the virtual token includes:
as a virtual token payment is selected in the payment terminal by the user in a store by the virtual token or it is determined, by a payment settlement service server, that a code is the virtual token, based on a type of the code received from the payment terminal or information included in the code, receiving, by the virtual token verification means, the virtual token from the payment settlement service server.

9. The method of claim 1, wherein the receiving of the virtual token includes:
as the virtual token generation means accesses a payment page in a store to enter the virtual token, receiving, by the virtual token verification means, the virtual token from the payment terminal, and
wherein the payment page in the store includes a first interface for entering the virtual token and a second interface for entering order information, as a page provided when an Intranet network in the store is accessed.

10. The method of claim 1, further comprising:
when a payment cancellation request is received from a specific virtual token generation means,
receiving the virtual token corresponding to a count at which a request for payment cancellation is made to the virtual token generation means;
searching, by the virtual token verification means, for the actual card number corresponding to the virtual token; and
making a request for cancellation of a previous payment for the actual card number to the financial company server.

11. A virtual token-based payment providing method, the method comprising:
receiving a virtual token generation function as a virtual token generation means registers an actual card number in a virtual token verification means, wherein the virtual token generation function corresponds to a storage location search algorithm in which the actual card number is stored in the virtual token verification means;
generating, by the virtual token generation means, a plurality of detailed codes matched with the payment request time point without performing communication with the virtual token verification means at a payment request time point of a user;
generating, by the virtual token generation means, a virtual token by combining the plurality of detailed codes; and
outputting, by the virtual token generation means, the virtual token to an outside to provide the virtual token to a virtual token verification server,
wherein the storage location search algorithm moves a storage location of the actual card number to a location corresponding to a plurality of detailed codes of a specific count or searches for a fixed storage location of the actual card number by the plurality of detailed codes of the specific count,
wherein the plurality of detailed codes include the first code and the second code, which are used to search for the storage location of the actual card number in the virtual token verification means,
wherein the first code and the second code are changed and generated by a detailed code generation function in the virtual token generation function for each unit count, and
wherein the unit count is set to a specific time interval and is changed as the time interval elapses.

12. The method of claim 11, wherein the virtual token further includes a fixed code,
wherein the fixed code is combined at a predetermined location within the virtual token, and includes a code for determining a card issuer or a card type corresponding to the actual card number or a code for identifying that whether to correspond to the virtual token.

13. A program for providing a virtual token-based payment that is stored in a medium to execute the method of claim 1 in combination with a computer that is a piece of hardware.

14. A virtual token generation device comprising:
a virtual token generation function reception unit configured to receive a virtual token generation function as an actual card number is registered in a virtual token verification means;
a detailed code generation unit configured to generate a plurality of detailed codes matched with a payment request time point without performing communication with the virtual token verification means at the payment request time point of a user;

a virtual token generation unit configured to generate a virtual token by combining the plurality of detailed codes; and a virtual token output unit configured to output the virtual token to an outside to provide the virtual token to a virtual token verification server, wherein the virtual token generation function corresponds to a storage location search algorithm where the actual card number is stored in the virtual token verification means, wherein the storage location search algorithm moves a storage location of the actual card number to a location corresponding to a plurality of detailed codes of a specific count or searches for a fixed storage location of the actual card number by the plurality of detailed codes of the specific count, wherein the plurality of detailed codes include a first code, a second code, and a fixed code, wherein the first code and the second code are used to search for the storage location of the actual card number within the virtual token verification means, and are changed and generated by a detailed code generation function in the virtual token generation function for each unit count, wherein the fixed code is a code that is combined at the predetermined location in the virtual token and determines a card issuer or a card type corresponding to the actual card number, and wherein the unit count is set to a specific time interval and is changed as the time interval elapses.

15. A virtual token verification server searching for an actual card number based on a virtual token, the server comprising:

a virtual token reception unit configured to receive the virtual token provided by a virtual token generation means;

a detailed code extraction unit configured to extract a plurality of detailed codes included in the virtual token;

an actual card number search unit configured to search for the actual card number based on the plurality of detailed codes; and an actual card number transmission unit configured to transmit the found actual card number to a financial company server, wherein the virtual token is matched with the actual card number by the virtual token generation means and then is generated, wherein each of the virtual token verification means and the virtual token generation means includes the same virtual token generation function, wherein the virtual token generation means receives the virtual token generation function to store the virtual token generation function in the virtual token generation means upon registering the actual card number to use a virtual token service and generates and outputs the virtual token matched with a payment request time point without communication with the virtual token verification means at the payment request time point of a user, wherein the plurality of detailed codes include a first code, a second code, and a fixed code which are used to search for a storage location of the actual card number in the virtual token verification means, wherein the fixed code is a code that is combined at the predetermined location in the virtual token and determines a card issuer or a card type corresponding to the actual card number, wherein the first code and the second code are changed and generated by a detailed code generation function in the virtual token generation function for each unit count, and wherein the unit count is set to a specific time interval and is changed as the time interval elapses.

* * * * *